US011822161B2

(12) United States Patent
Kawakami et al.

(10) Patent No.: US 11,822,161 B2
(45) Date of Patent: Nov. 21, 2023

(54) BIAS VOLTAGE ADJUSTMENT APPARATUS AND IQ OPTICAL MODULATION SYSTEM

(71) Applicant: NIPPON TELEGRAPH AND TELEPHONE CORPORATION, Tokyo (JP)

(72) Inventors: Hiroto Kawakami, Musashino (JP); Shoichiro Kuwahara, Musashino (JP); Yoshiaki Kisaka, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/781,339

(22) PCT Filed: Dec. 11, 2019

(86) PCT No.: PCT/JP2019/048447
§ 371 (c)(1),
(2) Date: May 31, 2022

(87) PCT Pub. No.: WO2021/117159
PCT Pub. Date: Jun. 17, 2021

(65) Prior Publication Data
US 2023/0004027 A1    Jan. 5, 2023

(51) Int. Cl.
*G02F 1/01*       (2006.01)
*H04B 10/556*    (2013.01)

(52) U.S. Cl.
CPC ....... *G02F 1/0123* (2013.01); *H04B 10/5561* (2013.01)

(58) Field of Classification Search
CPC .................... H04B 10/5561; G02F 1/0123
(Continued)

(56) References Cited

U.S. PATENT DOCUMENTS 8,041,228 B2 * 10/2011 Charlet ............ H04B 10/50577
398/208
9,020,361 B2 *  4/2015 Kawakami ....... H04B 10/50575
398/198
(Continued)

FOREIGN PATENT DOCUMENTS

EP            3130958 A1 *  2/2017  ............. H04B 10/00

OTHER PUBLICATIONS

Li et al; (Modulation-format-free and automatic bias control for optical IQ modulators based on dither-correlation detection; Apr. 2017; pp. 1-13. (Year: 2017).*
(Continued)

*Primary Examiner* — Amritbir K Sandhu
(74) *Attorney, Agent, or Firm* — Harness, Dickey & Pierce, P.L.C.

(57) ABSTRACT

Provided is a first bias power source that generates a first data bias voltage to be applied to an optical modulation unit for the I component, a second bias power source that generates a second data bias voltage to be applied to an optical modulation unit for the Q component, and a third bias power source that generates a quadrature bias voltage to be applied to an optical phase shifter, a data bias voltage adjustment unit that applies a feedback control to each of the first bias power source and the second bias power source, and a quadrature bias voltage adjustment unit that determines whether or not the quadrature bias voltage is optimal on a basis of a second optical QAM signal generated by an IQ optical modulator, and applies a feedback control to the third bias power source, in which a first optical QAM signal and the second optical QAM signal are generated by the IQ optical modulator but the optical phase difference between an optical electric field EI and an optical electric field EQ differs by $\pi$.

7 Claims, 10 Drawing Sheets

(58) Field of Classification Search
USPC .......................................................... 398/188
See application file for complete search history.

(56) References Cited

U.S. PATENT DOCUMENTS

| | | | | |
|---|---|---|---|---|
| 11,159,242 | B2* | 10/2021 | Kawakami | ............. H04B 10/54 |
| 2009/0269080 | A1* | 10/2009 | Akiyam | ............. H04B 10/5053 |
| | | | | 398/188 |
| 2010/0021182 | A1* | 1/2010 | Asano | ................ H04B 10/5561 |
| | | | | 398/188 |
| 2013/0141772 | A1* | 6/2013 | Jiang | ................ H04B 10/50575 |
| | | | | 359/279 |
| 2014/0153077 | A1* | 6/2014 | Kawakami | ................ G02F 1/21 |
| | | | | 359/259 |
| 2017/0163347 | A1* | 6/2017 | Akiyama | ............. H04B 10/548 |
| 2018/0088359 | A1* | 3/2018 | Shirakawa | ............ G02F 1/2257 |

OTHER PUBLICATIONS

Hiroto Kawakami et al., Auto bias control and bias hold circuit for IQ-modulator in flexible optical QAM transmitter with Nyquist filtering, Optics Express, vol. 22, No. 23, 2014, pp. 28163-28168.
Hiroto Kawakami et al., Auto bias control technique for optical 16-QAM transmitter with asymmetric bias dithering, Optics Express, vol. 19, No. 26, 2011, pp. B308-B312.

* cited by examiner

Fig. 9

| | | DECREASE ← $V_{bias1}$ → INCREASE | | |
|---|---|---|---|---|
| IDEAL CASE | OUTPUT PORT OPTICAL ELECTRIC FIELD (OPTICAL WAVEGUIDE 209) | (a) | (b) | (c) |
| | MODULATED LIGHT OPTICAL ELECTRIC FIELD (MODULATION MONITORING UNITS 90, 91) | (d) | (e) | (f) |
| CASE OF LOW EXTINCTION RATIO | OUTPUT PORT OPTICAL ELECTRIC FIELD (OPTICAL WAVEGUIDE 209) | (g) | (h) | (i) |
| | MODULATED LIGHT OPTICAL ELECTRIC FIELD (MODULATION MONITORING UNITS 90, 91) | (j) | (k) | (l) |

BIAS VOLTAGE ADJUSTMENT APPARATUS AND IQ OPTICAL MODULATION SYSTEM

CROSS-REFERENCE TO RELATED APPLICATIONS

This application is a 371 U.S. National Phase of International Application No. PCT/JP2019/048447, filed on Dec. 11, 2019. The entire disclosure of the above application is incorporated herein by reference.

TECHNICAL FIELD

The present invention relates to a bias voltage adjustment device that adjusts a bias voltage of an optical phase modulator, and to an IQ optical modulation system.

BACKGROUND ART

A known transmission coding used in optical transmission systems is Quadrature Amplitude Modulation (QAM), which is capable of transmitting high-capacity optical signals with a low symbol rate. FIG. 6 is a diagram illustrating a typical configuration example for generating a many-valued QAM optical signal using an IQ optical modulator 1. In the following, the description will be limited to n2-valued QAM (where n is a positive integer) such as 16-QAM, but similar issues and problems exist in all types of many-valued QAM, including 8-valued and 32-valued. In FIG. 6, the solid connecting lines denoted by the signs 200 to 209 are optical waveguides.

The IQ optical modulator 1 is provided with an optical modulation unit 10-$i$ for the in-phase (I) component, an optical modulation unit 10-$q$ for the quadrature (Q) component, and an optical phase shifter 40. The optical modulation units 10-$i$ and 10-$q$ are Mach-Zehnder interferometer (MZI) type optical modulators, for example.

With respect to the optical modulation unit 10-$i$, a driving amplifier 3-$i$ applies a voltage according to an electric driving signal of normal phase (Data1) and inverse phase ($\overline{\text{Data1}}$) corresponding to an n-valued data signal. With respect to the optical modulation unit 10-$q$, a driving amplifier 3-$q$ applies a voltage according to an electric driving signal of normal phase (Data2) and inverse phase ($\overline{\text{Data2}}$) corresponding to an n-valued data signal. With this arrangement, the IQ optical modulator 1 can modulate the phase and the intensity of input light supplied externally, in correspondence with the logic of Data1, $\overline{\text{Data1}}$ and Data2, $\overline{\text{Data2}}$. Here, the input light is continuous-wave (CW) light. Note that in FIG. 6 and other drawings, an overline ($\overline{\phantom{-}}$) above the characters Data1 and Data2 is used to denote a signal of inverse phase.

Also, by having bias power sources 4-$i$ and 4-$q$ apply positive/negative bias voltages $\pm V_{bias1}$ and $\pm V_{bias2}$ (hereinafter, $V_{bias1}$ and $V_{bias2}$ will be referred to as "data bias voltages") to each of the optical modulation units 10-$i$ and 10-$q$, optical phase shifts of $\pm j\theta_1$ and $\pm j\theta_2$ are further added to the modulated light propagating through the optical waveguides 202, 203, 206, and 207, respectively.

In an ideal IQ optical modulator, the data bias voltage $V_{bias1}$ of the bias power source 4-$i$ is chosen such that the optical modulation unit 10-$i$ is biased to the null point. Similarly, the data bias voltage $V_{bias2}$ of the bias power source 4-$q$ is chosen such that the optical modulation unit 10-$q$ is biased to the null point. Here, biasing each of the optical modulation units 10-$i$ and 10-$q$ to the null point refers to creating a state in which the light output by the optical modulation units 10-$i$ and 10-$q$ is extinguished at the instant when the differential voltage between the normal-phase and inverse-phase driving signals generated by each of the driving amplifiers 3-$i$ and 3-$q$ is 0 V, or when the driving amplifiers are stopped.

The optical phase shifter 40 imparts an optical phase shift to the modulated light propagating through the optical waveguide 208 with a bias voltage $V_{bias3}$ (hereinafter, $V_{bias3}$ will be referred to as a "quadrature bias voltage") applied by a bias power source 5. The modulated light propagating through the optical waveguide 208 and the modulated light propagating through the optical waveguide 204 are combined by an optical coupling unit 53 after an optical phase shift of $\theta_3$ is imparted by the optical phase shifter 40. Normally, $\theta_3$ is $+\pi/2$ or $-\pi/2$. This corresponds to imparting a phase shift equal to ¼ the carrier wavelength, that is, the wavelength of the input light of the IQ optical modulator 1. With this arrangement, the optical electric field of the modulated light that has passed through the optical shifter 4 (denoted $E_Q$ in this application) is orthogonal to the optical electric field of the modulated light that has propagated through the optical waveguide 204 (denoted $E_I$ in this application), and an optical QAM signal having the optimum constellation is obtained.

The optimal values of the data bias voltages $V_{bias1}$, $V_{bias2}$ and the quadrature bias voltage $V_{bias3}$ depend on the temperature and the wavelength of the input light, and also change depending on the stress imparted to the IQ optical modulator 1. Consequently, the modulated light generated by the IQ optical modulator 1 is monitored to determine whether or not the bias voltages $V_{bias1}$, $V_{bias2}$ and $V_{bias3}$ are optimal with respect to the optical modulation units 10-$i$, 10-$q$ and the optical phase shifter 40, and if the bias voltages are not optimal, it is necessary to apply a feedback control to the bias power sources 4-$i$, 4-$q$, and 5.

For example, FIG. 7 is a diagram illustrating one example of a configuration provided with a bias voltage adjustment device 100 that applies a feedback control to the bias power sources 4-$i$, 4-$q$, and 5. Note that in FIG. 7, components that are the same as FIG. 6 are denoted with the same signs. In FIG. 7, the optical coupling unit 53 is an optical coupler, for example. The bias voltage adjustment device 100 is provided with a bias voltage adjustment unit 101.

A modulated light monitoring unit 90 built into an IQ optical modulator 1$a$ receives modulated light 300 leaking out from the optical coupling unit 53. Here, the modulated light 300 is the modulated light obtained by combining the light modulated by the optical modulation unit 10-$i$ with the light modulated by the optical modulation unit 10-$q$ and phase-shifted by the optical phase shifter 40. The modulated light monitoring unit 90 converts the optical power or the like of the detected modulated light 300 into an electrical signal, and outputs the converted electrical signal to the bias voltage adjustment unit 101.

At this point, the optical power of the modulated light 300 leaking out from the optical coupling unit 53 will be described. For simplicity, consider the case where the two beams of light inputted into the optical coupling unit 53 are both CW light. If $\theta_3$ is 0, the interference efficiency of these two beams of CW light is maximized, and the optical power as seen from the optical waveguide 209 is maximized. However, because $\theta_3$ is set to $\pi/2$, the interference efficiency of the two beams of light inputted into the optical coupling unit 53 is halved, and the optical power as seen from the optical waveguide 209 is likewise halved. According to the law of conservation of energy, the remaining half leaks outside the optical waveguide 209. Consequently, if factors such as the coupling loss are ignored, the optical power received by the modulated light monitoring unit 90 will be equal to the light observed by the optical waveguide 209.

The bias voltage adjustment unit 101 determines a bias condition on the basis of the electrical signal outputted by the modulated light monitoring unit 90. In the case where it is necessary to change any of the bias voltages $V_{bias1}$, $V_{bias2}$, or $V_{bias3}$ on the basis of the determined bias condition, the bias voltage adjustment unit 101 applies a feedback control to the corresponding bias power source 4-$i$, 4-$q$, or 5. With this arrangement, all of the bias voltages $V_{bias1}$, $V_{bias2}$, and $V_{bias3}$ are maintained in an optimal state.

FIG. 8 is a diagram illustrating another configuration example of applying a feedback control to the bias power sources 4-$i$, 4-1, and 5. Note that in FIG. 8, components that are the same as FIGS. 6 and 7 are denoted with the same signs. In FIG. 8, an optical coupling unit 53$a$ is an optical multiplexer/demultiplexer, for example. The optical waveguide 204 and the optical waveguide 208 are respectively connected to two input ports of the optical coupling unit 53$a$, and the optical waveguide 209 and an optical waveguide 210 are respectively connected to two output ports. If the optical multiplexer/demultiplexer acting as the optical coupling unit 53$a$ has a split ratio of 1:1, an argument substantially the same as the leaking light above holds, and the optical power observed by the optical waveguide 209 and the optical power observed by the optical waveguide 210 are the same.

A modulated light monitoring unit 91 built into an IQ optical modulator 1$b$ is connected to the optical waveguide 210, and detects the light of an optical signal outputted by the optical coupling unit 53$a$ through the optical waveguide 210. Like the modulated light 300 described above, the light detected by the modulated light monitoring unit 91 is the modulated light obtained by combining the light modulated by the optical modulation unit 10-$i$ and inputted into the optical coupling unit 53$a$ with the light modulated by the optical modulation unit 10-$q$ and inputted into the optical coupling unit 53$a$ after being phase-shifted by the optical phase shifter 40.

The modulated light monitoring unit 91 converts the optical power or the like of the received modulated light into an electrical signal, and outputs the converted electrical signal to the bias voltage adjustment unit 101. The bias voltage adjustment unit 101 determines a bias condition on the basis of the electrical signal outputted by the modulated light monitoring unit 91, and adjusts the bias voltages $V_{bias1}$, $V_{bias2}$, and $V_{bias3}$ similarly to the configuration in FIG. 7.

CITATION LIST

Non-Patent Literature

Non-Patent Literature 1: H. Kawakami et al., "Auto bias control and bias hold circuit for IQ-modulator in flexible optical QAM transmitter with Nyquist filtering," Opt. Express, vol. 22, pp. 28163-28168, November 2014.

Non-Patent Literature 2: H. Kawakami et al., "Auto bias Technique for Optical 16QAM Transmitter with Asymmetric Bias Dithering," Opt. Express 19(26), B308-B312 (2011).

SUMMARY OF THE INVENTION

Technical Problem

The configurations of the bias voltage feedback control illustrated in FIGS. 7 and 8 share a common issue. Namely, the modulated light propagating through the optical waveguide 209 and the modulated light inputted into the modulated light monitoring unit 90 or the modulated light monitoring unit 91 are both many-valued QAM. However, the constellations are not the same, and the optical phase difference of $E_Q$ with respect to $E_I$ differs by 180°. This disparity is caused by the interference conditions between the light propagating through the waveguide and the light leaking out from the waveguide, or by the antisymmetry of the two output ports in the output of a 2:2 optical coupler, and because of this difference, there is an issue in that error may occur in the bias voltage adjustment depending on the conditions.

A specific example of this issue will be described with reference to FIG. 9. FIG. 9 is a diagram illustrating constellations in the case of performing a simulation of n=4, or in other words generating a 16-valued QAM signal, in the configurations illustrated in FIGS. 7 and 8.

Of the four rows, (a) to (f) on the top two rows are the constellations obtained in the case of treating the IQ optical modulators 1$a$ and 1$b$ as ideal IQ optical modulators.

Specifically, (a) to (c) are the constellations of the modulated light observed in the optical waveguide 209 (hereinafter referred to as the "constellations of the optical waveguide 209"). On the other hand, (d) to (f) are the constellations of the modulated light inputted into the modulated light monitoring units 90 and 91 (hereinafter referred to as the "constellations of the modulated light monitoring units 90 and 91"). Between the constellations of the optical waveguide 209 and the constellations of the modulated light monitoring units 90 and 91, the angle (optical phase difference) between $E_I$ and $E_Q$ differs by 180°, and consequently (a) and (d), (b) and (e), and (c) and (f) respectively exist in a phase conjugation relationship.

Also, (b) and (e) in the middle column are the constellations in the case where all of the bias voltages $V_{bias1}$, $V_{bias2}$, and $V_{bias3}$ including $V_{bias1}$ are in an optimal state. On the other hand, (a) and (d) in the left column are the constellations in the case where $V_{bias1}$ is smaller than the optimal value, and (c) and (f) in the right column are the constellations in the case where $V_{bias1}$ is larger than the optimal value. In the ideal IQ optical modulators 1$a$ and 1$b$, a comparison between the constellations of the modulated light monitoring units 90 and 91 and the constellations of the optical waveguide 209 for the same $V_{bias1}$ shows that the appearance of the constellations is unchanged. In the optimal constellation state, the symbols included in the constellation are disposed symmetrically with respect to the origin, and this state is obtained with (b) and (e) in the middle column.

In the ideal IQ optical modulator described so far, the extinction ratio of the optical modulation units 10-$i$ and 10-$q$ is infinite. On the other hand, in a real IQ optical modulator, the extinction ratio of the optical modulation units 10-$i$ and 10-$q$ is finite. For this reason, in real optical modulation units 10-$i$ and 10-$q$, light cannot be extinguished completely even in the state where no driving signal is being applied, and light leaking out from the optical modulation unit 10-$i$ or the optical modulation unit 10-$q$ may distort the constellation in some cases.

The constellations obtained by the IQ optical modulators 1 and 1$a$ in the case of a degraded extinction ratio in the optical modulation unit 10-$q$ are illustrated in (g) to (l) on the bottom two rows of FIG. 9. Here, (g) to (l) suppose a case in which there is a difference in the optical loss between the two arms, that is, the optical waveguides 206 and 207 of the optical modulation unit 10-$q$ in the IQ optical modulators 1$a$ and 1b, and the extinction ratio is degraded. In this case, EQ does not became 0, regardless of how the bias voltage $V_{bias2}$ is adjusted. For this reason, the constellations are distorted as a result, and the way in which the constellations are distorted is different between the constellations of the optical waveguide 209 and the constellations of the modulated light monitoring units 90 and 91. The state of an optimal constellation in the optical waveguide 209 is obtained in the case of (g), or in other words, in the case where the bias voltage $V_{bias1}$ is lowered compared to (b) and (e). In contrast, the state of an optimal constellation for the input of the modulated light monitoring units 90 and 91 is obtained in the case of (1), or in other words, in the case where the bias voltage $V_{bias1}$ is raised compared to (b) and (e).

Consequently, in the configuration examples in FIGS. 7 and 8, if the bias voltage $V_{bias1}$ is adjusted by referencing the light detected by the modulated light monitoring units 90 and 91, the signal quality of the optical QAM signal output from the optical waveguide 209 to the lightpath will be degraded. FIG. 9 illustrates an example of the case where the extinction ratio of the optical modulation unit 10-q for the Q component in the IQ optical modulators 1a and 1b is degraded, but similar distortion also occurs in the case where the extinction ratio of the optical modulation unit 10-i for the I component in the IQ optical modulators 1a and 1b is degraded, and if the bias voltage $V_{bias2}$ is adjusted by referencing the light detected by the modulated light monitoring units 90 and 91, the signal quality of the optical QAM signal output from the optical waveguide 209 to the lightpath will be degraded.

The issue of signal quality degradation described above can be addressed with a configuration provided with a bias voltage adjustment device 100b illustrated in FIG. 10, for example. Note that in FIG. 10, components that are the same as FIGS. 6 to 8 are denoted with the same signs.

In the configuration illustrated in FIG. 10, a portion of the optical signal propagating through the optical waveguide 209 is diverted to an optical waveguide 211 by using an optical tap 55 external to the IQ optical modulator 1. A modulated light monitoring unit 92 receives the light of the optical signal diverted by the optical tap 55 and propagating through the optical waveguide 211. The modulated light monitoring unit 92 converts the optical power or the like of the received light into an electrical signal, and outputs the converted electrical signal to the bias voltage adjustment unit 101.

Because $E_I$ and $E_Q$ have already been combined in the optical coupling unit 53, the phase difference between EI and EQ is uniquely determined at the input port of the optical tap 55. For this reason, the constellation of the optical QAM signal propagating through the optical waveguide 209 and the constellation of the optical QAM signal propagating through the optical waveguide 211 are the same. Consequently, if $V_{bias1}$ and $V_{bias2}$ are adjusted using the modulated light monitoring units 90 and 91 described above, it is possible to address the issue of the degraded signal quality of the optical QAM signal propagating through the optical waveguide 209.

However, with the configuration illustrated in FIG. 10, the split ratio of the optical tap 55 poses a problem. To maintain the signal quality of the optical signal after propagating through the lightpath, it is desirable to increase the light intensity of the optical QAM signal propagating through the optical waveguide 209. For this reason, the split ratio of the optical tap 55 needs to be set such that the light intensity of the optical signal diverted to the optical waveguide 211 is decreased.

With this arrangement, the light intensity of the modulated light received by the modulated light monitoring unit 92 is decreased, and the signal-to-noise (SN) ratio of the electrical signal generated by the modulated light monitoring unit 92 converting the modulated light is degraded. As a result, error occurs more easily in the determination of the bias condition performed by the bias voltage adjustment unit 101. The error is especially pronounced in the determination of the bias condition of $V_{bias3}$. The reason for this error is described below.

Generally, if the data bias voltages $V_{bias1}$ and $V_{bias2}$ deviate from the optimal values, the average intensity of the modulated light outputted from the IQ optical modulator 1 changes greatly. On the other hand, the quadrature bias voltage $V_{bias3}$ applied to the optical phase shifter 40 does not influence the average intensity of the modulated light outputted from the IQ optical modulator 1 even if $V_{bias3}$ deviates from the optimal value. For this reason, it is necessary to also use a technology such as asymmetric bias dithering when monitoring the quadrature bias, and a high sensitivity is demanded compared to monitoring the data bias in the modulated light monitoring unit 92 (for example, see Non-Patent Literature 1 and Non-Patent Literature 2, ch. 3-4).

Consequently, to determine the bias condition of the quadrature bias voltage $V_{bias3}$, it is desirable to raise the intensity of the modulated light inputted into the modulated light monitoring unit 92 and increase the SN ratio of the electrical signal processed by the bias voltage adjustment unit 101. However, raising the SN ratio necessitates increasing the light intensity of the optical signal diverted to the optical waveguide 211 by the optical tap 55. In that case, the light intensity of the optical QAM signal propagating through the optical waveguide 209 will be reduced, and as described above, maintaining the signal quality of the optical signal after propagating through the lightpath will be difficult.

In light of the above circumstances, an objective of the present invention is to provide a technology capable of minimizing the loss of the light intensity of the optical QAM optical signal outputted to the lightpath, and precisely adjusting the bias voltages without diminishing the signal quality of the propagated optical QAM signal.

Means for Solving the Problem

One aspect of the present invention is a bias voltage adjustment device that adjusts a plurality of bias voltages for optimally maintaining a signal quality of an optical QAM signal outputted from an IQ optical modulator including an optical modulation unit for an I component that generates an optical electric field EI on a basis of a data signal for the I component, an optical modulation unit for a Q component that generates an optical electric field EQ on a basis of a data signal for the Q component, and an optical phase shifter that adjusts an optical phase difference between the optical electric field EI and the optical electric field EQ, the bias voltage adjustment device comprising: a first bias power source that generates a first data bias voltage to be applied to the optical modulation unit for the I component; a second bias power source that generates a second data bias voltage to be applied to the optical modulation unit for the Q component; and a third bias power source that generates a quadrature bias voltage to be applied to the optical shifter; a data bias voltage adjustment unit that determines whether or not the first and second data bias voltages are optimal on a basis of the first optical QAM signal generated by the IQ optical modulator, and applies a feedback control to each of the first bias power source and the second bias power source; and a quadrature bias voltage adjustment unit that determines whether or not the quadrature bias voltage is optimal on a basis of the second optical QAM signal generated by the IQ optical modulator, and applies a feedback control to the third bias power source, wherein the first optical QAM signal and the second optical QAM signal are generated by the IQ optical modulator but the optical phase difference between the optical electric field EI and the optical electric field EQ differs by π.

Another aspect of the present invention is the above bias voltage adjustment device, wherein the quadrature bias voltage adjustment unit applies a feedback control causing the optical phases of the optical electric field EI and the optical electric field EQ of the second optical QAM signal to approach orthogonality, and the data bias voltage adjustment unit applies a feedback control such that symbols in a constellation of the first optical QAM signal are arranged as symmetrically as possible with respect to an origin.

Another aspect of the present invention is the above bias voltage adjustment device, wherein the quadrature bias voltage adjustment unit applies a feedback control causing the optical phases of the optical electric field EI and the optical electric field EQ of the second optical QAM signal to approach orthogonality, and the data bias voltage adjustment unit applies a feedback control such that the optical modulation unit for the I component and the optical modulation unit for the Q component are biased to a null point.

Another aspect of the present invention is an IQ optical modulation system comprising: an optical splitting unit that splits input light into first input light and second input light; an optical modulation unit for an I component, driven on a basis of a data signal for the I component, that modulates the first input light to generate an optical electric field EI; an optical modulation unit for a Q component, driven on a basis of a data signal for the Q component, that modulates the second input light to generate an optical electric field EQ; an optical phase shifter that adjusts an optical phase difference between the optical electric field EI and the optical electric field EQ; an optical coupling unit that combines the optical electric field EI and the optical electric field EQ with the phase difference adjusted by the optical phase shifter to generate an optical QAM signal, and outputs the generated optical QAM signal from an output port; an output side optical waveguide that externally outputs the optical QAM signal; a first bias power source that generates a first data bias voltage that adjusts a light intensity of the optical electric field EI in an undriven state to a predetermined value; a second bias power source that generates a second data bias voltage that adjusts a light intensity of the optical electric field EQ in an undriven state to a predetermined value; a third bias power source that generates a quadrature bias voltage that adjusts the optical phase difference produced by the optical phase shifter; a data bias voltage adjustment unit that controls values of the first and second data bias voltages outputted from the first and second bias power sources; a quadrature bias voltage adjustment unit that controls a value of the quadrature bias voltage outputted from the third bias power source; a first modulated light monitoring unit that monitors a first optical QAM signal obtained by using a splitting means to split the optical QAM signal propagating through the output side optical waveguide; and a second modulated light monitoring unit that monitors a second optical QAM signal, the second optical QAM signal being an optical signal leaked out from the optical coupling unit or an optical signal outputted from another output port provided in the optical coupling unit, wherein the data bias voltage adjustment unit applies a feedback control to the first and second bias power sources on a basis of a monitoring result of the first modulated light monitoring unit, and the quadrature bias voltage adjustment unit optimally maintains a signal quality of the first optical QAM signal by applying a feedback control to the third bias power source on a basis of a monitoring result of the second modulated light monitoring unit.

Another aspect of the present invention is the above IQ optical modulation system, wherein the data bias voltage adjustment unit sets the light intensity of both the optical electric field EI and the optical electric field EQ in the undriven state to 0, or applies a feedback control to the first bias power source and the second bias power source such that symbols in a constellation of the first optical QAM signal are arranged as symmetrically as possible with respect to an origin.

Another aspect of the present invention is the above IQ optical modulation system, further comprising: a polarization demultiplexer that separates input light into an X polarization and a Y polarization; two IQ optical modulators that respectively acquire the input light of the X polarization and the Y polarization separated by the polarization demultiplexer, each of the IQ optical modulators at least including the optical splitting unit, the optical modulation unit for the I component, the optical modulation unit for the Q component, the optical phase shifter, and the optical coupling unit; and a polarization multiplexer that polarization-multiplexes the optical QAM signal of the X polarization and the optical QAM signal of the Y polarization respectively outputted by the two IQ optical modulators, wherein the optical splitting unit splits the polarization-multiplexed optical QAM signal propagating through the output side optical waveguide, the first modulated light monitoring unit monitors an optical QAM signal obtained from the splitting by the optical splitting unit, and the data bias adjustment unit applies a feedback control to each of the two first bias power sources and each of the two second bias power sources on a basis of a monitoring result of the first modulated light monitoring unit.

Another aspect of the present invention is the above IQ optical modulation system, wherein a split ratio of the optical splitting unit is set such that the light intensity outputted toward the first modulated light monitoring unit is decreased, and also such that A/B is 10 or greater when the split ratio expressed as a ratio of light intensities is A:B.

Effects of the Invention

According to the present invention, it is possible to minimize the loss of the light intensity of the optical QAM optical signal outputted to the lightpath and precisely adjust all of the bias voltages without diminishing the signal quality of the transmitted optical QAM signal.

BRIEF DESCRIPTION OF DRAWINGS

FIG. 9 is a diagram illustrating constellations of an ideal IQ optical modulator and a real IQ optical modulator.

DESCRIPTION OF EMBODIMENTS

First Embodiment

Figure 1:
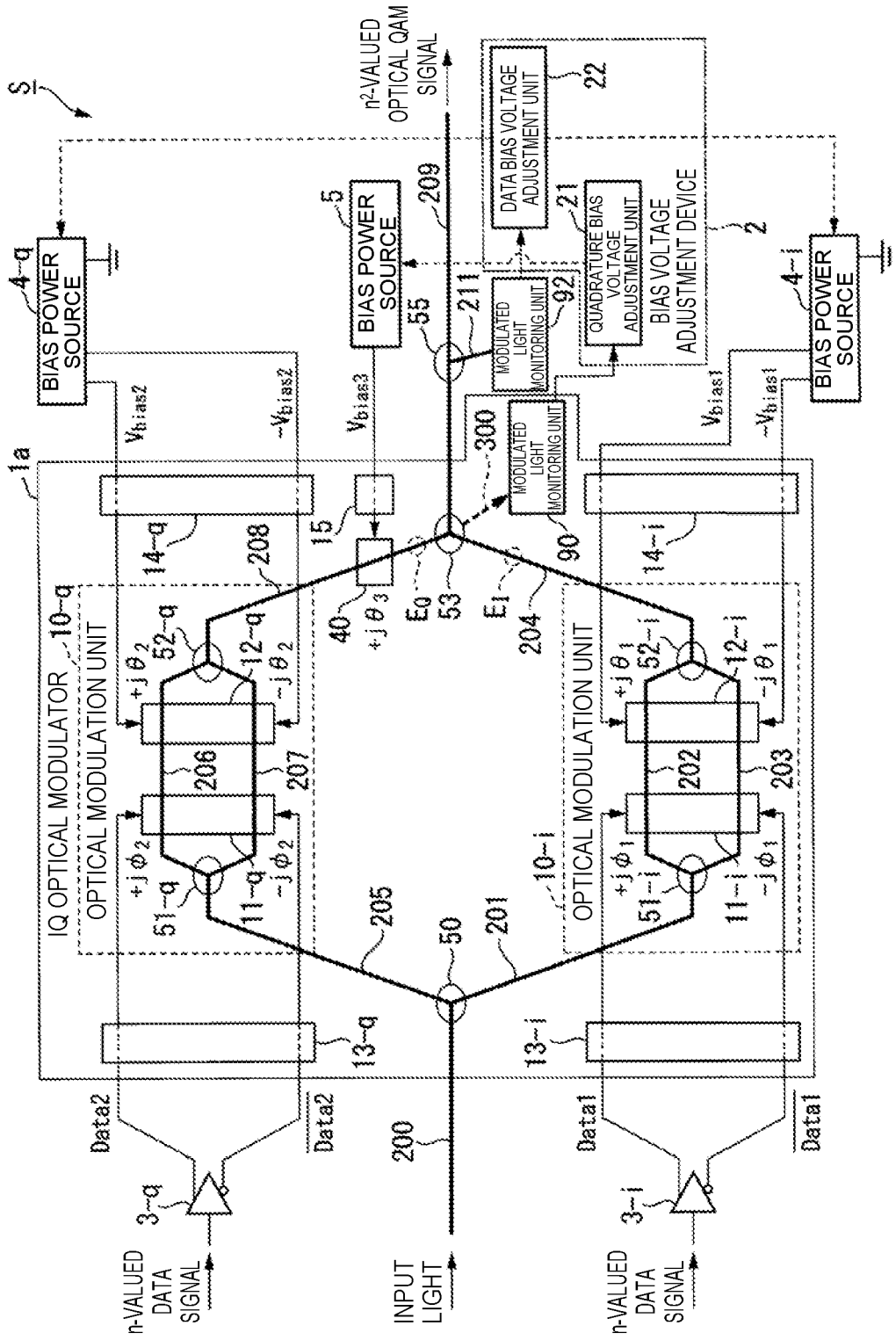
FIG. 1 is a block diagram illustrating a configuration of an IQ optical modulation system according to a first embodiment.

Hereinafter, an embodiment of the present invention will be described with reference to the drawings. FIG. 1 is a block diagram illustrating a configuration of an IQ optical modulation system S according to the first embodiment. Note that in FIG. 1, components which are the same as the components illustrated in FIGS. 6 to 8 and FIG. 10 referenced above are denoted with the same signs, and the configuration of the IQ optical modulation system S, including the configuration illustrated in FIGS. 6 to 8 and FIG. 10, will be described anew. Note that in FIG. 1, the solid connecting lines denoted by the signs 200 to 209 are optical waveguides.

The IQ optical modulation system S is provided with an IQ optical modulator 1a, driving amplifiers 3-i and 3-q, bias power sources 4-i, 4-q, and 5, an optical tap 55, a modulated light monitoring unit 92, and a bias voltage adjustment device 2. The IQ optical modulation system S is a configuration provided in an optical transmission device, for example, and the optical waveguide 209 is connected to a lightpath, for example. Hereinafter, the optical waveguide 209 is also referred to as the output side optical waveguide 209.

Each of the driving amplifiers 3-i and 3-q acquires an n-valued data signal. Here, an n-valued data signal refers to an n-valued non-return-to-zero (NRZ) signal, for example. The driving amplifier 3-i amplifies the acquired n-valued data signal into the two types of normal phase and inverse phase, generating and outputting the electric driving signals Data1 of normal phase and $\overline{\text{Data}}1$ of inverse phase. Similarly, the driving amplifier 3-q amplifies the acquired n-valued data signal into the two types of normal phase and inverse phase, generating and outputting the electric driving signals Data2 of normal phase and $\overline{\text{Data}}2$ of inverse phase.

The bias power source 4-i supplies positive and negative data bias voltages, namely $V_{bias1}$ and $-V_{bias1}$, which correspond to a bias voltage adjustment signal received from the bias voltage adjustment device 2. Here, $V_{bias1}$ takes a positive or negative value. Similarly, the bias power source 4-q supplies positive and negative data bias voltages, namely $V_{bias2}$ and $-V_{bias2}$, which correspond to a bias voltage adjustment signal received from the bias voltage adjustment device 2. Here, $V_{bias2}$ also takes a positive or negative value. The bias power source 5 supplies a quadrature bias voltage, namely $V_{bias3}$, which corresponds to a bias voltage adjustment signal received from the bias voltage adjustment device 2.

In the present embodiment, the IQ optical modulator 1a modulates input light supplied from an external source on the basis of two n-valued data signals, and generates an $n^2$-valued optical QAM signal. Here, the input light is CW light. Namely, the IQ optical modulator 1 generates the $n^2$-valued optical QAM signal by relatively varying the phase and the intensity of the input light in correspondence with the logic of Data1, $\overline{\text{Data}}1$ and Data2, $\overline{\text{Data}}2$. Here, n is a positive integer. For example, the case where n=2 results in 4-valued QAM, or in other words, quadrature phase shift keying (QPSK). Note that the IQ optical modulator 1a according to the present embodiment is capable of generating all types of many-valued QAM, including 4-valued, 8-valued, 16-valued, and 32-valued QAM.

The IQ optical modulator 1a is provided with optical modulation units 10-i and 10-q, driving signal electrodes 13-i and 13-q, data bias electrodes 14-i and 14-q, a quadrature bias electrode 15, an optical phase shifter 40, an optical splitting unit 50, an optical coupling unit 53, and a modulated light monitoring unit 90.

The driving signal electrodes 13-i and 13-q are connected to the driving amplifiers 3-i and 3-q and acquire the driving signals Data1, $\overline{\text{Data}}1$ and the driving signals Data2, $\overline{\text{Data}}2$ outputted by the driving amplifiers 3-i and 3-q, respectively. The data bias electrodes 14-i and 14-q are connected to the bias power sources 4-i and 4-q and acquire the data bias voltages supplied by the bias power sources 4-i and 4-q, namely $\pm V_{bias1}$ and $\pm V_{bias2}$, respectively. The bias power source 5 is connected to the quadrature bias electrode 15, and the quadrature bias electrode 15 acquires the quadrature bias voltage $V_{bias3}$ supplied by the bias power source 5.

The optical splitting unit 50 is an optical coupler, for example, and includes an input port to which the optical waveguide 200 (hereinafter, the optical waveguide 200 will be referred to as the "input side optical waveguide 200") is connected, and two output ports to which the optical waveguides 201 and 205 are connected. The optical splitting unit 50 divides, or in other words splits, input light supplied from an external source through the input side optical waveguide 200 into two, outputting one of the split beams of input light to the optical waveguide 201 and the other split beam of input light to the optical waveguide 205.

The optical modulation unit 10-i for the I component is provided with an optical splitting unit 51-i, an optical coupling unit 52-i, an optical modulator 11-i, an optical phase shift unit 12-i, and two arms, namely the optical waveguides 202 and 203. The optical splitting unit 51-i is an optical coupler, for example, and includes an input port to which the optical waveguide 201 is connected, and two output ports to which the optical waveguides 202 and 203 are connected. The optical splitting unit 51-i divides, or in other words splits, input light acquired from the optical waveguide 201, and outputs the split input light to the optical waveguides 202 and 203.

The optical modulator 11-i is connected to the driving signal electrode 13-i. The optical modulator 11-i applies a voltage to each of the optical waveguides 202 and 203 according to each of the driving signals Data1 and $\overline{\text{Data}}1$ acquired by the driving signal electrode 13-i. With this arrangement, a phase shift of $+j\varphi_1$ corresponding to the applied voltage is induced in the input light propagating through the optical waveguide 202, a phase shift of $-j\varphi_1$ corresponding to the applied voltage is induced in the input light propagating through the optical waveguide 203, and modulated light is generated. Here, $\varphi_1$ takes a positive or negative value according to the value of Data1.

The optical phase shift unit 12-$i$ is connected to the data bias electrode 14-$i$. The optical phase shift unit 12-$i$ applies the voltage of each of the data bias voltages $V_{bias1}$ and $-V_{bias1}$ being supplied to the data bias electrode 14-$i$ to the optical waveguides 202 and 203, respectively. With this arrangement, a phase shift of $+j\theta_1$ corresponding to the applied data bias voltage $V_{bias1}$ is induced in the optical signal propagating through the optical waveguide 202 and a phase shift of $-j\theta_1$ corresponding to the applied data bias voltage $-V_{bias1}$ is induced in the modulated light propagating through the optical waveguide 203. Here, $\theta_1$ takes a positive or negative value according to the value of $V_{bias1}$.

The optical coupling unit 52-$i$ is an optical coupler, for example, and includes two input ports to which the optical waveguides 202 and 203 are connected, and an output port to which the optical waveguide 204 is connected. The optical coupling unit 52-$i$ combines the modulated light propagating through the optical waveguides 202 and 203, and outputs the combined light to the optical waveguide 204.

The optical modulation unit 10-$q$ for the Q component is provided with an optical splitting unit 51-$q$, an optical coupling unit 52-$q$, an optical modulator 11-$q$, an optical phase shift unit 12-$q$, and two arms, namely the optical waveguides 206 and 207. The optical splitting unit 51-$q$ is an optical coupler, for example, and includes an input port to which the optical waveguide 205 is connected and two output ports to which the optical waveguides 206 and 207 are connected. The optical splitting unit 51-$q$ divides, or in other words splits, input light acquired from the optical waveguide 205, and outputs the split input light to the optical waveguides 206 and 207.

The optical modulator 11-$q$ is connected to the driving signal electrode 13-$q$. The optical modulator 11-$q$ applies a voltage to each of the optical waveguides 206 and 207 according to each of the driving signals Data2 and $\overline{\text{Data2}}$ acquired by the driving signal electrode 13-$q$. With this arrangement, a phase shift of $+j\varphi_2$ corresponding to the applied voltage is induced in the input light propagating through the optical waveguide 206, a phase shift of $-j\varphi_2$ corresponding to the applied voltage is induced in the input light propagating through the optical waveguide 207, and modulated light is generated. Here, $\varphi_2$ takes a positive or negative value according to the value of Data2.

The optical phase shift unit 12-$q$ is connected to the data bias electrode 14-$q$. The optical phase shift unit 12-$q$ applies the voltage of each of the data bias voltages $V_{bias2}$ and $-V_{bias2}$ being supplied to the data bias electrode 14-$q$ to the optical waveguides 206 and 207, respectively. With this arrangement, a phase shift of $+j\theta_2$ corresponding to the applied data bias voltage $V_{bias2}$ is induced in the modulated light propagating through the optical waveguide 206 and a phase shift of $-j\theta_2$ corresponding to the applied data bias voltage $-V_{bias2}$ is induced in the modulated light propagating through the optical waveguide 207. Here, $\theta_2$ takes a positive or negative value according to the value of $V_{bias2}$.

The optical coupling unit 52-$q$ is an optical coupler, for example, and includes two input ports to which the optical waveguides 206 and 207 are connected, and an output port to which the optical waveguide 208 is connected. The optical coupling unit 52-$q$ combines the modulated light propagating through the optical waveguides 206 and 207, and outputs the combined light to the optical waveguide 208.

The optical phase shifter 40 is connected to the quadrature bias electrode 15. The optical phase shifter 40 applies the voltage of the quadrature bias voltage $V_{bias3}$ being supplied to the quadrature bias electrode 15 to the optical waveguide 208. With this arrangement, a phase shift corresponding to the applied quadrature bias voltage $V_{bias3}$ is induced in the modulated light propagating through the optical waveguide 208.

The optical coupling unit 53 is an optical coupler, for example, and includes two input ports to which the optical waveguides 204 and 208 are connected, and an output port to which the output side optical waveguide 209 is connected. The optical coupling unit 53 combines the modulated light propagating through the optical waveguides 204 and 208 with an optical phase difference of $\theta_3$, and outputs the combined result to the output side optical waveguide 209. The optical phase difference $\theta_3$ is adjusted to $\pm\pi/2$ by the optical phase shifter 40 and the quadrature bias voltage $V_{bias3}$.

The modulated light monitoring unit 90 is provided in the IQ optical modulator 1$a$, receiving and detecting modulated light 300 leaking out from the optical coupling unit 53. Here, the modulated light 300 is the modulated light obtained by combining the input light modulated by the optical modulation unit 10-$i$ with the input light modulated by the optical modulation unit 10-$i$ and the optical phase shifter 40. The modulated light monitoring unit 90 converts the optical power or the like of the detected modulated light 300 into an electrical signal, and outputs the converted electrical signal to a quadrature bias adjustment unit 21.

The optical tap 55 is provided on the output side optical waveguide 209 and divides the optical signal propagating through the output side optical waveguide 209 into a main optical signal and a diverted optical signal (hereinafter referred to as the "branch optical signal") according to a predetermined split ratio. The main optical signal propagates through the output side optical waveguide 209, while the branch optical signal propagates through an optical waveguide 211 connected to the optical tap 55. Here, the predetermined split ratio is 10:1, for example, such that the branch optical signal with one-eleventh the light intensity of the optical signal acquired from the input port of the optical tap 55 is diverted to the optical waveguide 211, while the main optical signal with the remaining ten-elevenths light intensity propagates through the output side optical waveguide 209. Note that the split ratio may also be a ratio larger than 10:1, such as 15:1 or 20:1, for example.

The modulated light monitoring unit 92 receives the light of the branch optical signal diverted by the optical tap 55 and propagating through the optical waveguide 211. The modulated light monitoring unit 92 converts the optical power or the like of the received light into an electrical signal, and outputs the converted electrical signal to a data bias adjustment unit 22.

The bias voltage adjustment device 2 is provided with the quadrature bias voltage adjustment unit 21 and the data bias voltage adjustment unit 22.

The quadrature bias voltage adjustment unit 21 determines the bias condition of $V_{bias3}$ on the basis of the electrical signal outputted by the modulated light monitoring unit 90. In the case where it is necessary to change the quadrature bias voltage $V_{bias3}$ on the basis of the determined bias condition, the quadrature bias voltage adjustment unit 21 applies a feedback control to the corresponding bias power source 5.

The data bias voltage adjustment unit 22 determines the bias condition of the two data bias voltages $V_{bias1}$ and $V_{bias2}$ on the basis of the electrical signal outputted by the modulated light monitoring unit 92. In the case where it is necessary to change either of the data bias voltages $V_{bias1}$ or $V_{bias2}$ on the basis of the determined bias condition, the data bias voltage adjustment unit 22 applies a feedback control to the corresponding bias power source 4-$i$ or 4-$q$.

Note that there are various ways of implementing the bias condition determination performed by the quadrature bias voltage adjustment unit 21 and the data bias voltage adjustment unit 22, and for example, a technique such as the asymmetric bias dithering illustrated in Non-Patent Literature 1 can be applied.

Here, the data bias voltage adjustment unit 22 needs to monitor the two bias conditions of $V_{bias1}$ and $V_{bias2}$. In other words, when the data bias is determined to be divergent from the optimal value, it is necessary to determine whether the divergence is in $V_{bias1}$, $V_{bias2}$, or both. It is possible to make the determination by, for example, providing data bias dithering means and synchronous detection means in the data bias voltage adjustment unit 22, setting a time period in which dithering is added only to the data bias voltage $V_{bias1}$ and a time period in which dithering is added only to the data bias voltage $V_{bias2}$, performing synchronous detection synchronized with the dithering in each of the time periods, and using the techniques described in Non-Patent Literature 1 and 2 to monitor the bias conditions of $V_{bias1}$ and $V_{bias2}$ by time sharing. Alternatively, a method may be adopted in which two each of the data bias dithering means and the synchronous detection means are provided in the data bias voltage adjustment unit 22, different frequencies are set as the frequency of dithering added to the data bias voltage $V_{bias1}$ and the frequency of dithering added to the data bias voltage $V_{bias2}$, two instances of synchronous detection synchronized with the two frequencies are performed in parallel, and the techniques described in Non-Patent Literature 1 and 2 are used to monitor the bias conditions of $V_{bias1}$ and $V_{bias2}$ in parallel.

Process by IQ Optical Modulation System According to First Embodiment

Figure 2:
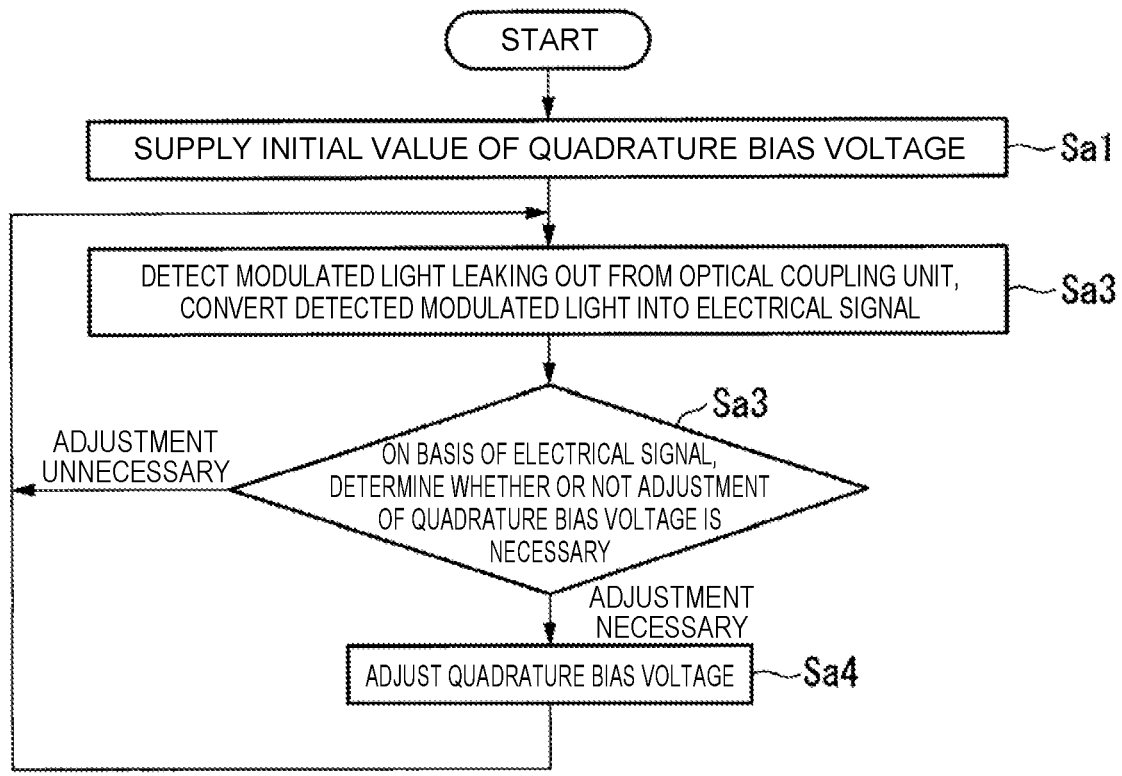
FIG. 2 is a flowchart illustrating a process of adjusting the quadrature bias voltage in the IQ optical modulation system according to the first embodiment.
Figure 3:
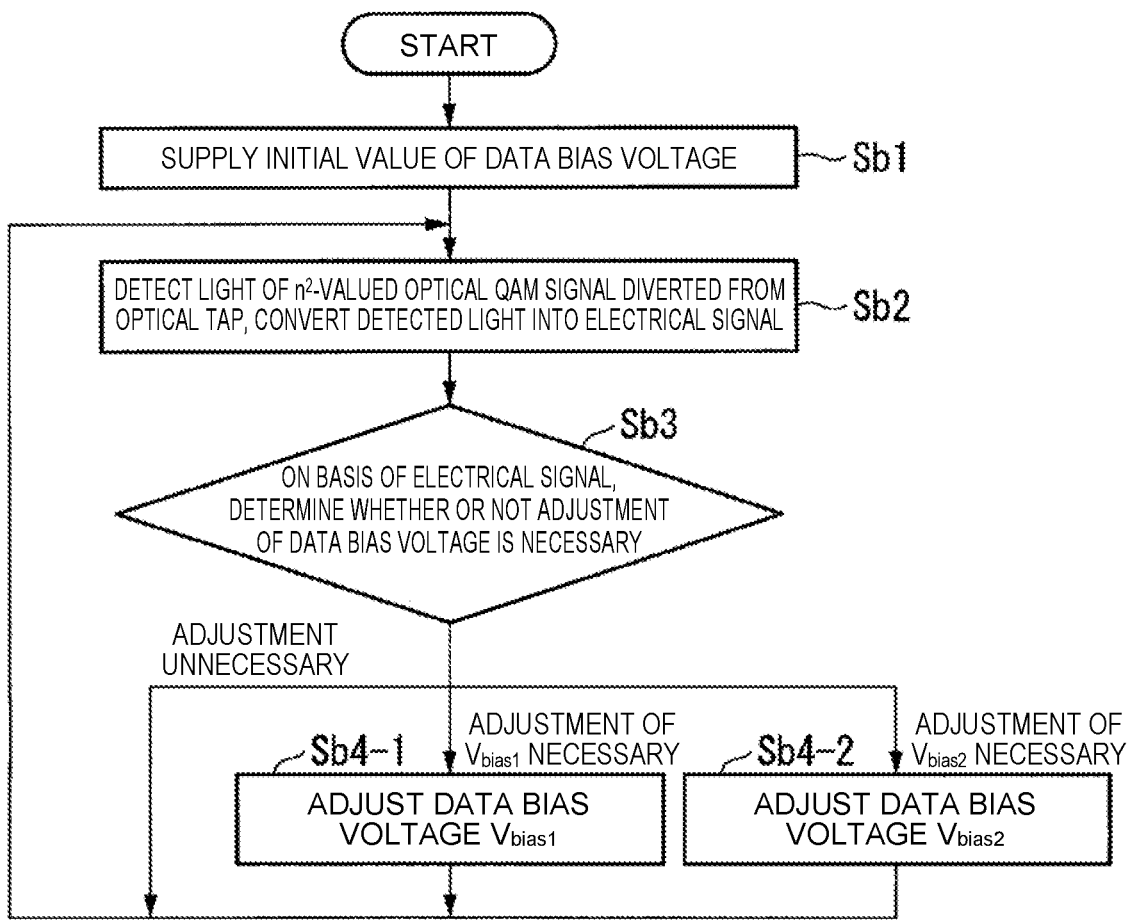
FIG. 3 is a flowchart illustrating a process of adjusting the data bias voltages in the IQ optical modulation system according to the first embodiment.

FIGS. 2 and 3 are flowcharts illustrating processes of controlling the quadrature bias voltage $V_{bias3}$ in the IQ optical modulation system S according to the first embodiment. In parallel with the processes of the flowcharts in FIGS. 2 and 3, input light is continually supplied from an external source through the input side optical waveguide 200. Also, two n-valued data signals are sequentially supplied to each of the driving amplifiers 3-$i$ and 3-$q$ from an external source. The driving amplifiers 3-$i$ and 3-$q$ output the generated driving signals Data1, $\overline{\text{Data}}$1 and Data2, $\overline{\text{Data}}$2 to the driving signal electrode 13-$i$ and the driving signal electrode 13-$q$.

Quadrature Bias Voltage Adjustment Process

First, the process illustrated in FIG. 2 will be described. The bias power source 5 supplies a predetermined initial value of the quadrature bias voltage $V_{bias3}$ to the quadrature bias electrode 15 (step Sa1).

The quadrature bias voltage $V_{bias3}$ being supplied to the quadrature bias electrode 15 is applied to the optical phase shifter 40. With this arrangement, a phase shift corresponding to the applied quadrature bias voltage $V_{bias3}$ is induced in the modulated light propagating through the optical waveguide 208.

The modulated light monitoring unit 90 receives the modulated light 300 leaking out from the optical coupling unit 53. The modulated light monitoring unit 90 converts the optical power or the like of the detected modulated light 300 into an electrical signal, and outputs the converted electrical signal to the quadrature bias voltage adjustment unit 21 (step Sa2).

The quadrature bias voltage adjustment unit 21 acquires the electrical signal outputted by the modulated light monitoring unit 90, determines the bias condition on the basis of the acquired electrical signal, and determines whether or not adjustment of the quadrature bias voltage $V_{bias3}$ is necessary (step Sa3). In the case of determining that adjustment of the quadrature bias voltage $V_{bias3}$ is necessary (step Sa3, adjustment necessary), the quadrature bias voltage adjustment unit 21 calculates a new quadrature bias voltage $V_{bias3}$ on the basis of the bias condition determination result, and outputs a bias voltage adjustment signal including the calculated value of the quadrature bias voltage $V_{bias3}$ to the bias power source 5. The bias power source 5 acquires the bias voltage adjustment signal outputted by the quadrature bias voltage adjustment unit 21 and supplies a quadrature bias voltage $V_{bias3}$ having the value included in the acquired bias voltage adjustment signal to the quadrature bias electrode 15 (step Sa4). Thereafter, the process proceeds to step SSa2.

On the other hand, in the case where the quadrature bias voltage adjustment unit 21 determines that adjustment of the quadrature bias voltage $V_{bias3}$ is not necessary (step Sa3, adjustment unnecessary), the process advances to step Sa2.

By feeding back the quadrature bias voltage $V_{bias3}$ as above, the quadrature bias voltage $V_{bias3}$ is adjusted to bring $E_I$ and $E_Q$ into an orthogonal state.

Data Bias Voltage Adjustment Process

Next, the process in FIG. 3 will be described. The bias power sources 4-$i$ and 4-$q$ supply predetermined initial values of the data bias voltages $\pm V_{bias1}$ and $\pm V_{bias2}$ to the data bias electrodes 14-$i$ and 14-$q$, respectively (step Sb1).

The optical tap 55 diverts a portion of the optical QAM signal propagating through the output side optical waveguide 209 and outputs the diverted branch optical signal to the optical waveguide 211. The modulated light monitoring unit 92 of the bias voltage adjustment device 2 receives the branch optical signal propagating through the optical waveguide 211. The modulated light monitoring unit 92 converts the optical power or the like of the received branch optical signal into an electrical signal, and outputs the converted electrical signal to the data bias voltage adjustment unit 22 (step Sb2).

The data bias voltage adjustment unit 22 acquires the electrical signal outputted by the modulated light monitoring unit 92, determines the bias conditions on the basis of the acquired electrical signal, and determines whether or not adjustment of the data bias voltages $V_{bias1}$ and $V_{bias2}$ is necessary (step Sb3).

In the case of determining that adjustment of the data bias voltage $V_{bias1}$ is necessary (step Sb3, $V_{bias1}$ adjustment necessary), the data bias voltage adjustment unit 21 calculates a new data bias voltage $V_{bias1}$ on the basis of the bias condition determination result, and outputs a bias voltage adjustment signal including the calculated value of the data bias voltage $V_{bias1}$ to the bias power source 4-$i$. The bias power source 4-$i$ acquires the bias voltage adjustment signal outputted by the data bias voltage adjustment unit 22 and supplies a data bias voltage $V_{bias1}$ having the value included in the acquired bias voltage adjustment signal to the data bias electrode 14-$i$ (step Sb4-1). Thereafter, the process proceeds to step Sb2.

In the case of determining that adjustment of the data bias voltage $V_{bias2}$ is necessary (step Sb3, $V_{bias2}$ adjustment necessary), the data bias voltage adjustment unit 21 calculates a new data bias voltage $V_{bias2}$ on the basis of the bias condition determination result, and outputs a bias voltage adjustment signal including the calculated value of the data bias voltage $V_{bias2}$ to the bias power source 4-*q*. The bias power source 4-*q* acquires the bias voltage adjustment signal outputted by the data bias voltage adjustment unit 22 and supplies a data bias voltage $V_{bias2}$ having the value included in the acquired bias voltage adjustment signal to the data bias electrode 14-*q* (step Sb4-2). Thereafter, the process proceeds to step Sb2.

Note that in the case of determining that adjustment of both of the data bias voltages $V_{bias1}$ and $V_{bias2}$ is necessary, the data bias voltage adjustment unit 22 performs the processes of both steps Sb4-1 and Sb4-2. On the other hand, in the case where the data bias voltage adjustment unit 22 determines that adjustment of both of the data bias voltages $V_{bias1}$ and $V_{bias2}$ is not necessary (step Sb3, adjustment unnecessary), the process advances to step Sb2.

By performing a feedback process for the data bias voltages $V_{bias1}$ and $V_{bias2}$ as above, the data bias voltages $V_{bias1}$ and $V_{bias2}$ are adjust to optimize the constellation of the $n^2$-valued optical QAM signal propagating through the output side optical waveguide 209. In the ideal IQ optical modulator 1 as illustrated in (b) and (e) of FIG. 9, the above state is achieved by controlling $V_{bias1}$ and $V_{bias2}$ to be at the null point. On the other hand, in a non-*i*deal IQ optical modulator as illustrated in (g) of FIG. 9, the data bias voltages $V_{bias1}$ and $V_{bias2}$ are adjusted such that the symbols in the constellation approach a symmetric arrangement with respect to the origin.

In the configuration of the first embodiment above, in the bias voltage adjustment device 2, the data bias voltage adjustment unit 22 adjusts the data bias voltages $V_{bias1}$ and $V_{bias2}$ on the basis of the branch optical signal obtained by splitting the optical QAM signal propagating through the output side optical waveguide 209. The quadrature bias voltage adjustment unit 21 adjusts the quadrature bias voltage $V_{bias3}$ on the basis of the optical signal leaking out from the optical coupling unit 53 that combines the output optical signals from the optical modulation units 10-*i* and 10-*q* for the I and Q components given a phase difference by the optical phase shifter 40 and outputs an optical QAM signal from the output port. By taking such a configuration, advantages like the following are obtained.

The determination of the bias condition necessary to adjust the data bias voltages $V_{bias1}$ and $V_{bias2}$ is easily influenced by manufacturing errors (for example, a degraded extinction ratio in the optical modulation unit 10-*i* or 10-*q*) of the IQ optical modulator 1, as illustrated on the bottom two rows of FIG. 9. Consequently, it is desirable to use the optical tap 55 in order to avoid a method of monitoring that uses leakage light like the modulated light 300. Using the optical tap 55 has the demerit of incurring a fixed optical loss according to the split ratio, but as described above, the SN ratio demanded for the signal processing by the modulated light monitoring unit 92 in the monitoring of the data bias voltages $V_{bias1}$ and $V_{bias2}$ may be relatively low, which alleviates this demerit. For this reason, a high split ratio can be set to keep the optical power inputted into the modulated light monitoring unit 31 low, and a high optical power to be sent to the lightpath can be set.

In contrast, the determination of the bias condition necessary to adjust the quadrature bias voltage $V_{bias3}$ demands highly sensitive monitoring compared to the data bias voltages $V_{bias1}$ and $V_{bias2}$ described above. For this reason, the input optical power into the modulated light monitoring unit 90 must be raised, and the SN ratio of the electrical signal processed by the modulated light monitoring unit 90 must be increased. Consequently, the modulated light monitoring unit 90 should not be connected to an optical component with a large loss such as the optical tap 55, and it is desirable to use leakage light like the modulated light 300.

Using leakage light has the demerit of being susceptible to adverse influence due to constellation distortion as illustrated in FIG. 9. However, compared to the optical modulation units 10-*i* and 10-*q*, the optical phase shifter 40 that is subject to the control of the quadrature bias voltage $V_{bias3}$ is a much simpler circuit, and therefore is influenced less by manufacturing errors in the IQ optical modulator 1*a*. Consequently, the above demerit is alleviated.

Figure 7:
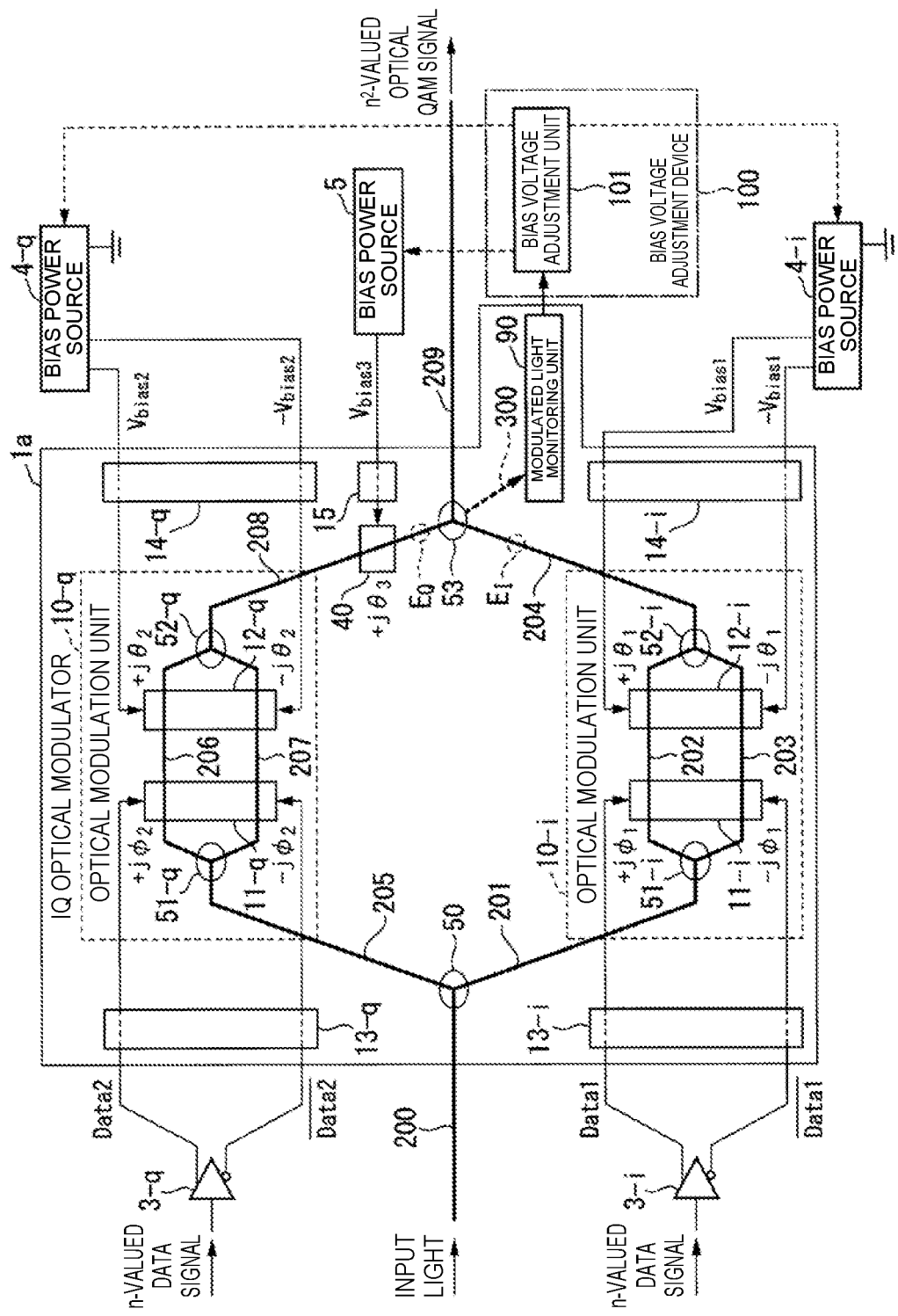
FIG. 7 is a block diagram illustrating a configuration example (1 of 3) for adjusting the bias voltage through feedback.
Figure 8:
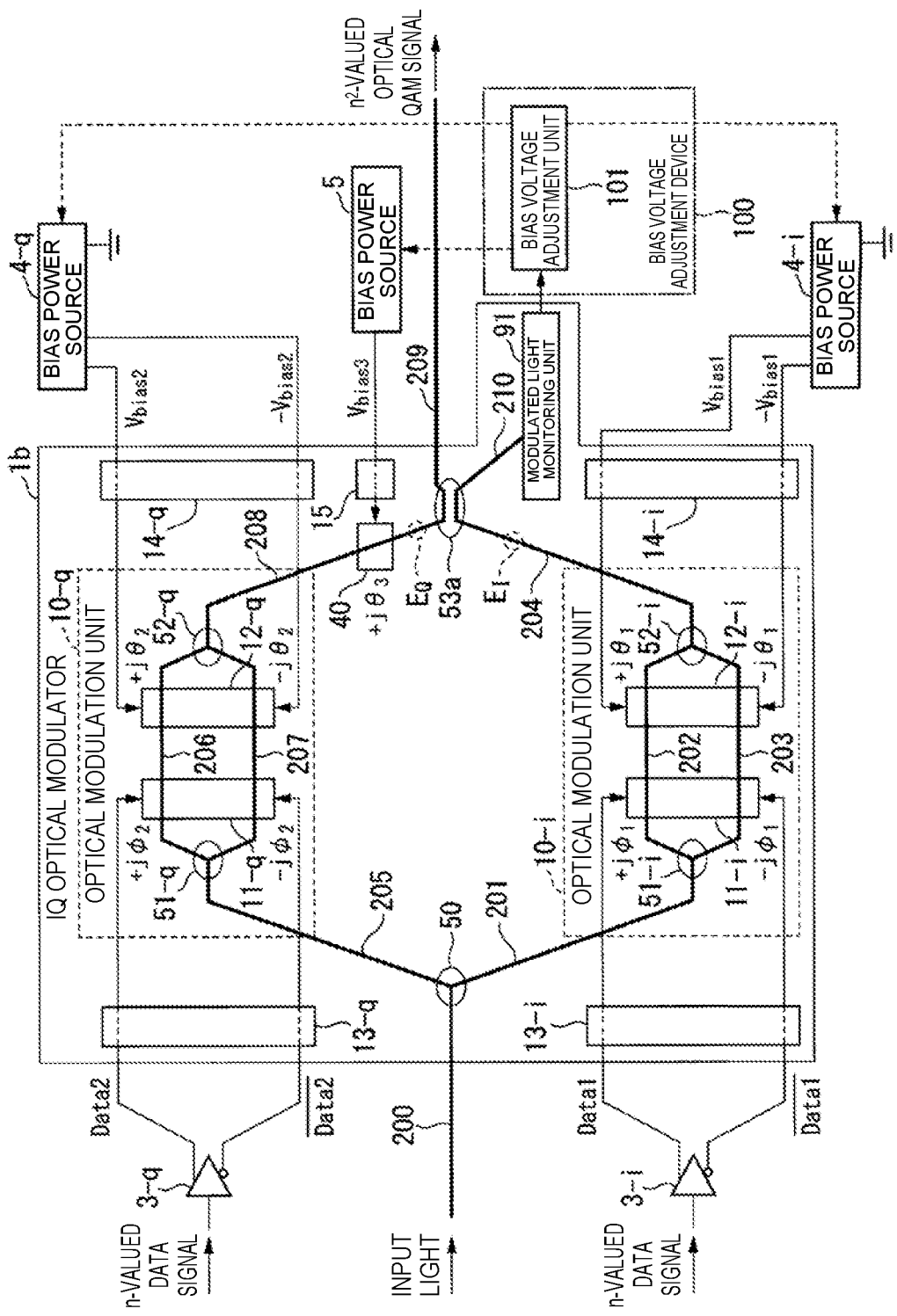
FIG. 8 is a block diagram illustrating a configuration example (2 of 3) for adjusting the bias voltage through feedback.
Figure 10:
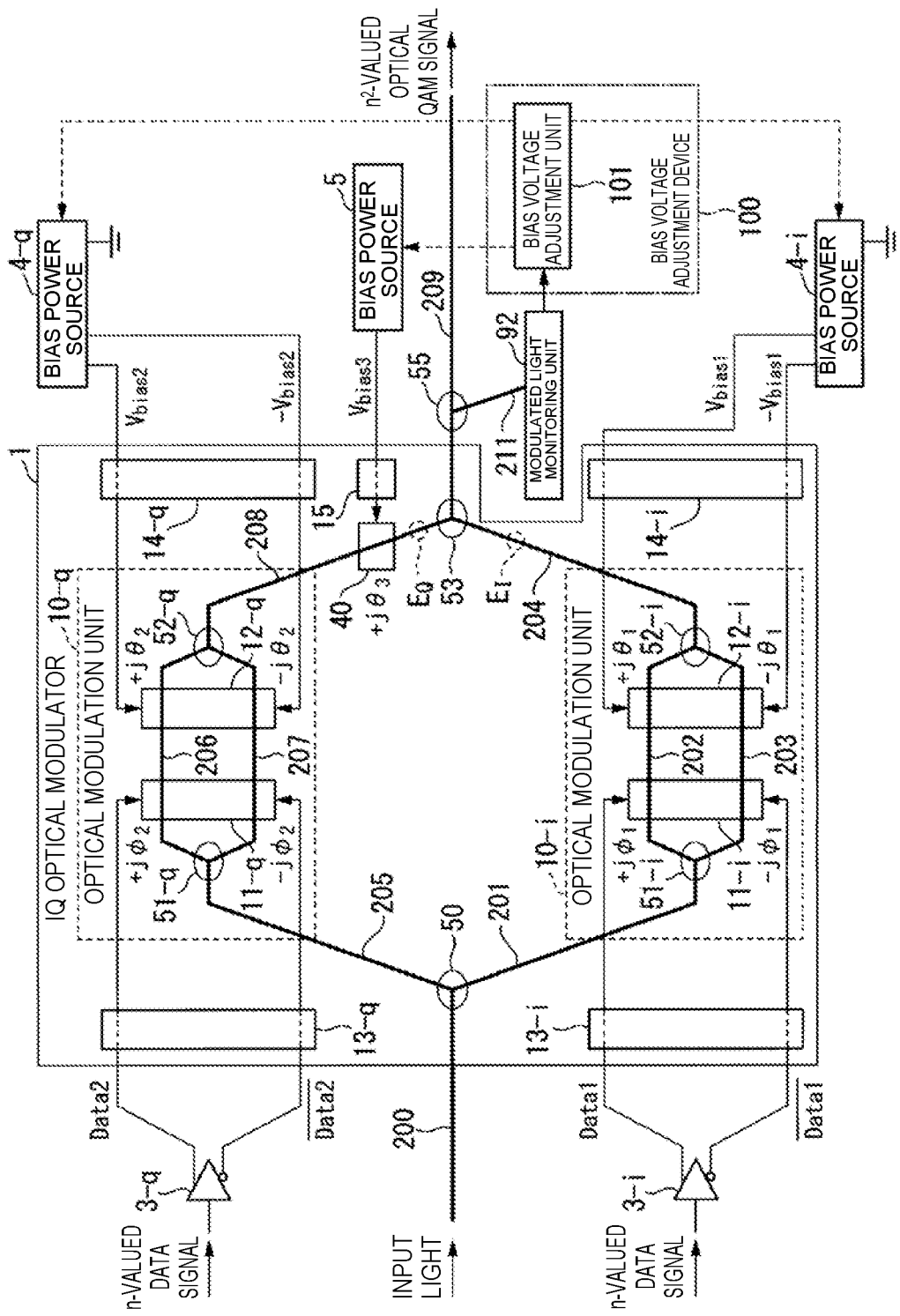
FIG. 10 is a block diagram illustrating a configuration example (3 of 3) for adjusting the bias voltage through feedback.

In other words, the IQ optical modulation system S according to the first embodiment can take an eclectic configuration that applies the configuration illustrated in FIG. 10 to the feedback control of the data bias voltages $V_{bias1}$ and $V_{bias2}$, and applies the configuration illustrated in FIGS. 7 and 8 to the feedback control of the quadrature bias voltage $V_{bias3}$.

Second Embodiment

Figure 4:
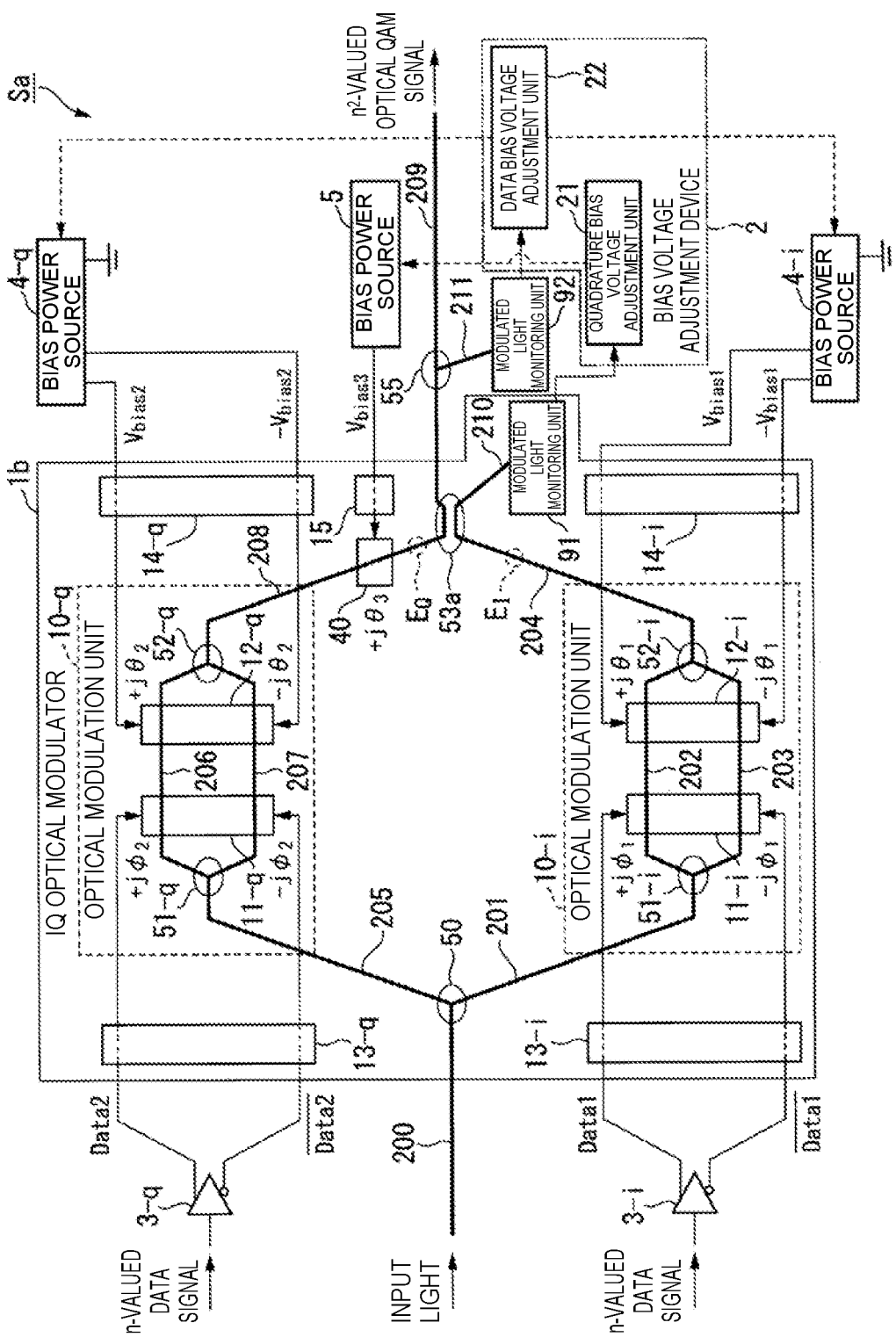
FIG. 4 is a block diagram illustrating a configuration of an IQ optical modulation system according to a second embodiment.

FIG. 4 is a block diagram illustrating a configuration of an IQ optical modulation system Sa according to the second embodiment. In FIG. 4, components that are the same as the first embodiment and components that are the same as the components illustrated in FIGS. 6 to 8 and FIG. 10 are denoted with the same signs, and hereinafter, the components that are different will be described.

The IQ optical modulation system Sa is provided with an IQ optical modulator 1*b*, driving amplifiers 3-*i* and 3-*q*, bias power sources 4-*i*, 4-*q*, and 5, an optical tap 55, a modulated light monitoring unit 92, and a bias voltage adjustment device 2. The IQ optical modulation system Sa is a configuration provided in an optical transmission device, for example, and the output side optical waveguide 209 is connected to a lightpath, for example.

The IQ optical modulator 1*b* is provided with optical modulation units 10-*i* and 10-*q*, driving signal electrodes 13-*i* and 13-*q*, data bias electrodes 14-*i* and 14-*q*, a quadrature bias electrode 15, an optical phase shifter 40, an optical splitting unit 50, an optical coupling unit 53*a*, and a modulated light monitoring unit 91. The optical coupling unit 53*a* is an optical multiplexer/demultiplexer as described with reference to FIG. 8, for example. The optical waveguide 204 and the optical waveguide 208 are respectively connected to two input ports of the optical coupling unit 53*a*, and the output side optical waveguide 209 and an optical waveguide 210 are respectively connected to two output ports.

The modulated light monitoring unit 91 is provided in the IQ optical modulator 1*b*, connected to the optical waveguide 210, and receives the light of the optical signal that the optical coupling unit 53*a* outputs to the optical waveguide 210. Like the modulated light 300 leaking out from the optical coupling unit 53 in the first embodiment, the light received by the modulated light monitoring unit 91 is the modulated light obtained by combining the input light modulated by the optical modulation unit 10-*i* with the input light modulated by the optical modulation unit 10-*i* and phase-shifted by the optical phase shifter 40. The modulated light monitoring unit 91 converts the optical power or the like of the received modulated light into an electrical signal, and outputs the converted electrical signal to the quadrature bias adjustment unit 21.

Process by IQ Optical Modulation System
According to Second Embodiment

The process by the IQ optical modulation system Sa is the same as the process performed by the IQ optical modulation system S according to the first embodiment, except that in the process illustrated in FIG. 2, the processing in step Sa2 is replaced with the following processing. In the second embodiment, in step Sa2, the modulated light monitoring unit 91 receives the light of the modulated light that the optical coupling unit 53a outputs to the optical waveguide 210. The modulated light monitoring unit 91 converts the optical power or the like of the received light into an electrical signal, and outputs the converted electrical signal to the quadrature bias voltage adjustment unit 21.

In the configuration of the second embodiment above, in the bias voltage adjustment device 2a, the data bias voltage adjustment unit 22 adjusts the data bias voltages $V_{bias1}$ and $V_{bias2}$ on the basis of the branch optical signal obtained by splitting the optical QAM signal propagating through the output side optical waveguide 209. The quadrature bias voltage adjustment unit 21 adjusts the quadrature bias voltage $V_{bias3}$ on the basis of the modulated light outputted from the optical waveguide 210 provided in the optical coupling unit 53a that combines the output optical signals from the optical modulation units 10-i and 10-q for the I and Q components given a phase difference by the optical phase shifter 40. Because the input optical power of the modulated light monitoring unit 91 can be increased over the input optical power of the modulated light monitoring unit 92, it is possible to maintain the light intensity of the optical QAM optical signal outputted to the lightpath and also adjust the bias voltage without degrading the signal quality of the transmitted optical QAM signal.

Also, in the IQ optical modulation system Sa according to the second embodiment, because the modulated light monitoring unit 91 is connected to the optical waveguide 210, it is possible to detect not only the optical power but also phase information about the modulated light (optical QAM signal), and furthermore, it is also possible to detect and demodulate the spectrum of the light. Consequently, the IQ optical modulation system Sa according to the second embodiment is capable of performing the bias condition determination with higher precision than the IQ optical modulation system S according to the first embodiment.

Third Embodiment

Figure 5:
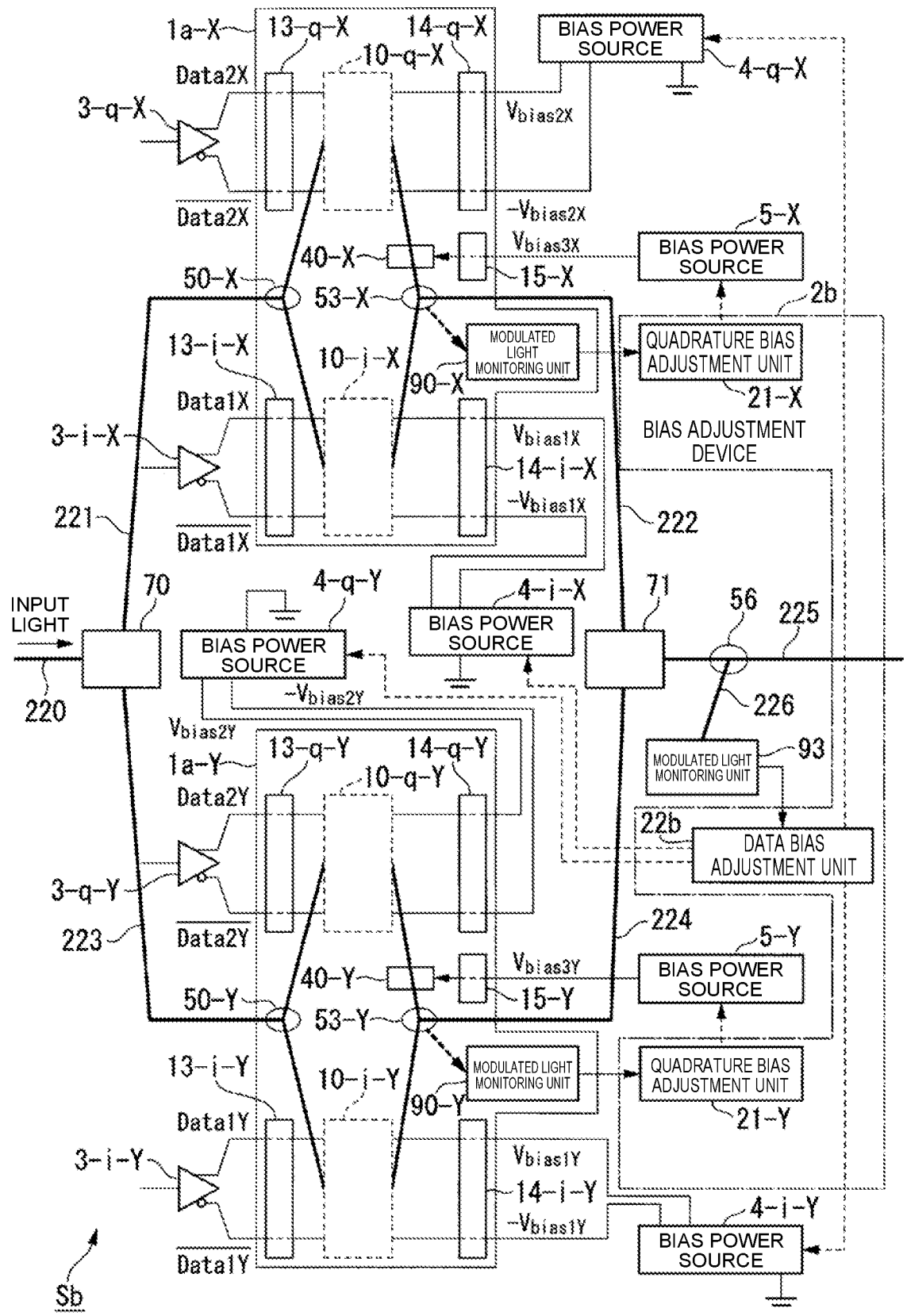
FIG. 5 is a block diagram illustrating a configuration of an IQ optical modulation system according to a third embodiment.
Figure 6:
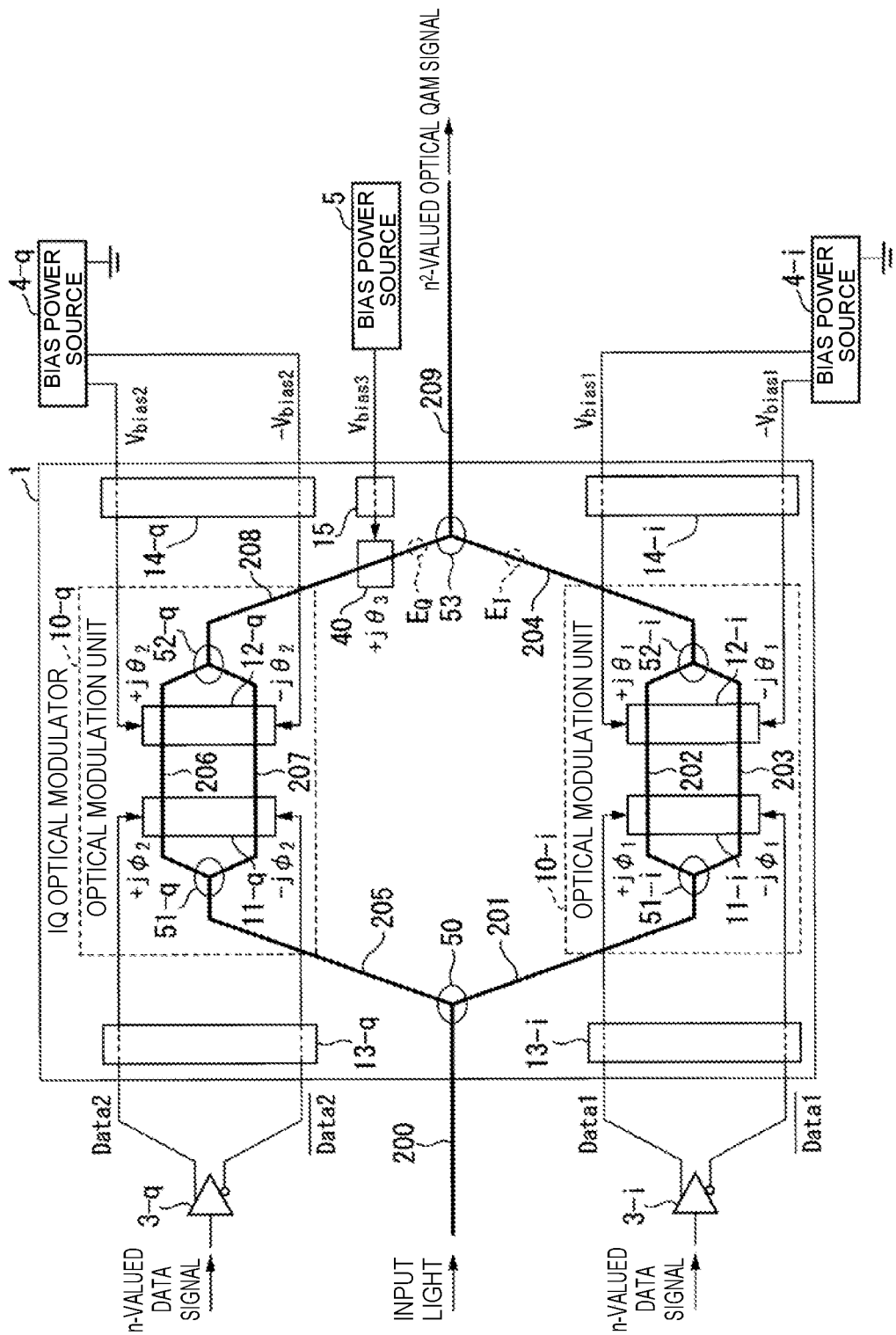
FIG. 6 is a block diagram illustrating a typical configuration example for performing IQ optical modulation.

FIG. 5 is a block diagram illustrating a configuration of an IQ optical modulation system Sb according to the third embodiment. In the IQ optical modulation systems S and Sa according to the first and second embodiments, a single-polarization optical QAM signal is generated, but in the third embodiment, a multi-polarization optical QAM signal in which an X polarization and a Y polarization are multiplexed is generated. In FIG. 4, components that are the same as the first and second embodiments and components that are the same as the components illustrated in FIGS. 6 to 8 and FIG. 10 are denoted with the same signs, and hereinafter, the components that are different will be described.

The IQ optical modulation system Sb is provided with a polarization demultiplexer 70, a polarization multiplexer 71, an IQ optical modulator 1a-X for the X polarization, an IQ optical modulator 1a-Y for the Y polarization, driving amplifiers 3-i-X and 3-q-x for the X polarization, driving amplifiers 3-i-Y and 3-q-Y for the Y polarization, bias power sources 4-i-X, 4-q-X, and 5-X for the X polarization, bias power sources 4-i-Y, 4-q-Y, and 5-Y for the Y polarization, an optical tap 56, a modulated light monitoring unit 93, and a bias voltage adjustment device 2b. The IQ optical modulation system Sb is a configuration provided in an optical transmission device, for example, and an optical waveguide 225 is connected to a lightpath, for example. Hereinafter, the optical waveguide 225 is also referred to as the output side optical waveguide 225.

The IQ optical modulator 1a-X for the X polarization and the IQ optical modulator 1a-Y for the Y polarization are provided with the same configuration as the IQ optical modulator 1a illustrated in FIG. 1. For example, the optical modulation unit 10-i-X provided in the IQ optical modulator 1a-X for the X polarization and the optical modulation unit 10-i-Y provided in the IQ optical modulator 1a-Y for the Y polarization have the same configuration as the optical modulation unit 10-i of the IQ optical modulator 1. Hereinafter, each functional unit provided in the IQ optical modulator 1a-X for the X polarization will be denoted by appending "-X" to the sign of the corresponding functional unit provided in the IQ optical modulator 1a, and each functional unit provided in the IQ optical modulator 1a-Y for the Y polarization will be denoted by appending "-Y" to the sign of the corresponding functional unit provided in the IQ optical modulator 1a.

To reiterate the description of the modulated light monitoring unit 90-X provided in the IQ optical modulator 1a-X for the X polarization and the modulated light monitoring unit 90-Y provided in the IQ optical modulator 1a-Y for the Y polarization, the modulated light monitoring unit 90-X receives the modulated light leaking out from the optical coupling unit 53-X of the IQ optical modulator 1a-x. The modulated light monitoring unit 90-X converts the optical power or the like of the received modulated light into an electrical signal, and outputs the converted electrical signal to the quadrature bias voltage adjustment unit 21-X.

The modulated light monitoring unit 90-Y receives modulated light leaking out from the optical coupling unit 53-Y of the IQ optical modulator 1a-Y. The modulated light monitoring unit 90-Y converts the optical power or the like of the received modulated light into an electrical signal, and outputs the converted electrical signal to the quadrature bias voltage adjustment unit 21-Y.

Note that although the internal configurations of the optical modulation units 10-i-X, 10-i-Y and the optical modulation units 10-q-X, 10-q-Y are not illustrated due to space limitations, each includes the same internal configuration as the optical modulation unit 10-i and the optical modulation unit 10-q of the IQ optical modulator 1a. In the following description, when referring to the configuration in the optical modulation unit 10-i-X corresponding to the optical waveguide 202 provided in the optical modulation unit 10-i, for example, the sign "-X" will be appended to refer to the configuration as the optical waveguide 202-X.

Also, an optical waveguide 221 connected to the IQ optical modulator 1a-X for the X polarization on the input side and an optical waveguide 223 connected to the IQ optical modulator 1a-Y for the Y polarization on the input side correspond to the optical waveguide 200 in FIG. 1. Also, an optical waveguide 222 connected to the IQ optical modulator 1a-X for the X polarization on the output side and an optical waveguide 224 connected to the IQ optical modulator "1a-Y for the Y polarization on the output side correspond to the optical waveguide 209 in FIG. 1.

Each of the driving amplifiers 3-i-X, 3-q-X, 3-i-Y, and 3-q-Y acquires an n-valued data signal. Each of the driving amplifiers 3-i-X, 3-q-X, 3-i-Y, and 3-q-Y amplifies the acquired n-valued data signal into the two types of normal phase and inverse phase to generate an electric driving signal, similarly to the driving amplifiers 3-*i* and 3-*q* illustrated in FIG. 1. In FIG. 4, the driving signals respectively generated by the driving amplifiers 3-*i*-X, 3-*q*-X, 3-*i*-Y, and 3-*q*-Y are denoted (Data1X, $\overline{\text{Data1X}}$), (Data2X, $\overline{\text{Data2X}}$), (Data1Y, $\overline{\text{Data1Y}}$), and (Data2Y, $\overline{\text{Data2Y}}$).

Each of the bias power sources 4-*i*-X, 4-*q*-X, 4-*i*-Y, and 4-*q*-Y acquires a bias voltage adjustment signal outputted by the data bias voltage adjustment unit 22*b* of the bias voltage adjustment device 2*b*. Each of the bias power sources 4-*i*-X, 4-*q*-X, 4-*i*-Y, and 4-*q*-Y supplies a data bias voltage having the value included in the acquired bias voltage adjustment signal to the data bias electrodes 14-*i*-X, 14-*q*-X, 14-*i*-Y, and 14-*q*-Y. In FIG. 4, the data bias voltages respectively supplied by the bias power sources 4-*i*-X, 4-*q*-X, 4-*i*-Y, and 4-*q*-Y are denoted $\pm V_{bias1X}$, $\pm V_{bias2X}$, $\pm V_{bias1Y}$, and $\pm V_{bias2Y}$.

Each of the bias power sources 5-X and 5-Y acquires a bias voltage adjustment signal outputted by the quadrature bias voltage adjustment unit 21-X of the bias voltage adjustment device 2*b*. Each of the bias power sources 5-X and 5-Y supplies a data bias voltage having the value included in the acquired bias voltage adjustment signal to the quadrature bias electrodes 15-X and 15-Y. In FIG. 4, the data bias voltages respectively supplied by the bias power sources 5-X and 5-Y are denoted $V_{bias3X}$ and $V_{bias3Y}$.

The polarization demultiplexer 70 is a beam splitter, for example, and includes an input port to which the optical waveguide 220 (hereinafter, the optical waveguide 220 will be referred to as the "input side optical waveguide 220") is connected, and two output ports to which the optical waveguides 221 and 223 are connected. The polarization demultiplexer 70 separates the input light propagating through the input side optical waveguide 220 into an X polarization and a Y polarization. Here, the input light is CW light like the first and second embodiments, for example. The polarization demultiplexer 70 outputs the separated X polarization input light to the optical waveguide 221 and the Y polarization input light to the optical waveguide 223.

The polarization multiplexer 71 is a beam combiner, for example, and includes two input ports to which the optical waveguides 222 and 224 are connected, and an output port to which the output side optical waveguide 225 is connected. The polarization multiplexer 71 multiplexes the optical QAM signal of the X polarization propagating through the optical waveguide 222 and the optical QAM signal of the Y polarization propagating through the optical waveguide 224, and outputs the combined polarization-multiplexed optical QAM signal to the output side optical waveguide 225.

The optical tap 56 is provided on the output side optical waveguide 225 and divides the polarization-multiplexed optical QAM signal propagating through the output side optical waveguide 225 into a main optical signal and a diverted optical signal (hereinafter referred to as the "branch optical signal") according to a predetermined split ratio. The main optical signal propagates through the output side optical waveguide 225, while the branch optical signal propagates through an optical waveguide 226 connected to the optical tap 56. Here, similarly to the optical tap 55 of the first and second embodiments, the predetermined split ratio is 10:1, for example, such that the branch optical signal with one-eleventh the light intensity of the optical signal acquired from the input port of the optical tap 56 is diverted to the optical waveguide 226, while the main optical signal with the remaining ten-elevenths light intensity propagates through the output side optical waveguide 225. Note that the split ratio may also be a ratio larger than 10:1, such as 15:1 or 20:1, for example.

The modulated light monitoring unit 93 receives the light of the branch optical signal propagating through the optical waveguide 226. The modulated light monitoring unit 93 converts the received light into an electrical signal, and outputs the converted electrical signal to the data bias voltage adjustment unit 22*b*.

The bias adjustment device 2*b* is provided with the quadrature bias adjustment units 21-X, 21-Y and the data bias adjustment unit 22*b*.

The quadrature bias adjustment unit 21-X determines a bias condition on the basis of the electrical signal outputted by the modulated light monitoring unit 90-X. In the case where it is necessary to change the quadrature bias voltage $V_{bias3X}$ on the basis of the determined bias condition, the quadrature bias adjustment unit 21-X applies a feedback control to the corresponding bias power source 5-X. The quadrature bias adjustment unit 21-Y determines a bias condition on the basis of the electrical signal outputted by the modulated light monitoring unit 90-Y. In the case where it is necessary to change the quadrature bias voltage $V_{bias3Y}$ on the basis of the determined bias condition, the quadrature bias adjustment unit 21-Y applies a feedback control to the corresponding bias power source 5-Y.

The data bias voltage adjustment unit 22*b* determines the bias condition of the four data bias voltages $V_{bias1X}$, $V_{bias2X}$, $V_{bias1Y}$, and $V_{bias2Y}$ on the basis of the electrical signal outputted by the modulated light monitoring unit 93. The time-sharing method or the method of dividing according to frequency described above is applied to the bias condition determination.

In the case where it is necessary to change any of the data bias voltages $V_{bias1X}$, $V_{bias2X}$, $V_{bias1Y}$, or $V_{bias2Y}$ on the basis of the determined bias condition, the data bias voltage adjustment unit 22*b* applies a feedback control to the corresponding bias power source 4-*i*-X, 4-*q*-X, 4-*i*-Y, or 4-*q*-Y.

Process by IQ Optical Modulation System According to Third Embodiment

The process by the IQ optical modulation system Sb is the same as the process performed by the data bias adjustment unit 22 according to the first and second embodiments, except that in the process illustrated in FIG. 3, the processing in step Sb3 is replaced with the following processing. In the third embodiment, in step Sb3, the modulated light monitoring unit 92 and the data bias voltage adjustment unit 22*b* monitor the bias conditions of $V_{bias1X}$, $V_{bias2X}$, $V_{bias1Y}$, and $V_{bias2Y}$, and if it is necessary to change any of the data bias voltages $V_{bias1X}$, $V_{bias2X}$, $V_{bias1Y}$, or $V_{bias2Y}$, a feedback control is applied to the corresponding bias power source 4-*i*-X, 4-*q*-X, 4-*i*-Y, or 4-*q*-Y.

In the third embodiment above, the quadrature bias voltages $V_{bias3X}$ and $V_{bias3Y}$ are adjusted individually by the quadrature bias voltage adjustment units 21-X and 21-Y, respectively, whereas the data bias voltages $V_{bias1X}$, $V_{bias2X}$, $V_{bias1Y}$, and $V_{bias2Y}$ are adjusted collectively by the data bias voltage adjustment unit 22*b* on the basis of the branch optical signal diverted from the polarization-multiplexed optical QAM signal. With this arrangement, a loss of light intensity in the polarization-multiplexed optical QAM signal outputted to the lightpath can be moderated compared to the case of adjusting the data bias voltages individually for each of the X polarization and the Y polarization. Consequently, it is possible to adjust the bias voltages while maintaining the light intensity of the optical QAM optical signal outputted to the lightpath, without diminishing the signal quality of the optical QAM signal.

Note that in the configuration of the third embodiment described above, the modulated light monitoring units 90-X and 90-Y are configured to detect the modulated light leaking out from the optical coupling units 53-X and 53-Y, respectively, but the configuration of the second embodiment may also be applied. That is, the optical coupling units 53-X and 53-Y are replaced by optical coupling units 53a-X and 53a-Y having the same configuration as the optical coupling unit 53a acting as an optical multiplexer/demultiplexer in the second embodiment. In addition, the modulated light monitoring units 90-X and 90-Y are replaced by modulated light monitoring units 91-X and 91-Y having the same configuration as the modulated light monitoring unit 91 in the second embodiment. The optical coupling unit 53a-X and the modulated light monitoring unit 91-X are connected by an optical waveguide 210-X, while the optical coupling unit 53a-Y and the modulated light monitoring unit 91-Y are connected by an optical waveguide 210-Y. With this arrangement, the modulated light monitoring units 91-X and 91-Y are capable of detecting phase information, thereby making it possible to determine the bias condition with higher precision than the IQ optical modulation system Sb of the third embodiment.

Also, in the configuration of the first to third embodiments above, the optical phase shifters 40, 40-X, and 40-Y are disposed on the output side of the optical modulation units 10-q, 10-q-X, and 10-q-Y for the Q component, but the configuration is not limited to this arrangement, and the optical phase shifters 40, 40-X, and 40-Y may also be disposed on the input side or the output side of the optical modulation units 10-i, 10-i-X, and 10-i-Y for the I component, or on the input side of the optical modulation units 10-q, 10-q-X, and 10-q-Y for the Q component.

Also, in the configuration of the first to third embodiments above, the driving signal electrodes 13-i, 13-q, 13-i-X, 13-q-X, 13-i-Y, and 13-q-Y are configured as dual-driving IQ optical modulators that supply reciprocal positive/negative driving signals with respect to the IQ optical modulators 1a, 1b, 1a-X, and 1a-Y, but may also be configured as single-driving IQ optical modulators. In the case of configuring a single-driving IQ optical modulator, in the configuration of the first embodiment for example, only the Data1 driving signal is supplied to the driving signal electrode 13-i and only the Data2 driving signal is supplied to the driving signal electrode 13-q. The optical modulator 11-i of the optical modulation unit 10-i applies a voltage corresponding to the Data1 driving signal to the optical waveguides 202 and 203. The optical modulator 11-q of the optical modulation unit 10-q applies a voltage corresponding to the Data2 driving signal to the optical waveguides 206 and 207. In this case, a phase shift similar to the dual-driving case is produced in each of the optical waveguides 202, 203, 206, and 207 due to the anisotropy of the optical waveguides 202, 203, 206, and 207.

Also, in the configuration of the first and second embodiments above, the positive/negative data bias voltages $\pm V_{bias1}$ and $\pm V_{bias2}$ are used with respect to the single IQ optical modulators 1a and 1b, such that the optical phase of the modulated light propagating through the optical waveguides 202 and 203 is adjusted in a push-pull manner and the optical phase of the modulated light propagating through the optical waveguides 206 and 207 is adjusted in a push-pull manner. In contrast, a configuration that sets the data bias voltage to 0 on one side and performs monophase control of only the optical phase of the modulated light propagating through the optical waveguide 202 and the modulated light propagating through the optical waveguide 206 is also possible. Even in the above case, the data bias voltages $V_{bias1}$ and $V_{bias2}$ may be positive or negative. Similarly, in the configuration of the third embodiment, a configuration that performs monophase rather than push-pull control of the two optical waveguides forming a pair in the optical modulation units 10-i-X, 10-q-X, 10-i-Y, and 10-q-Y in each polarization is also possible.

Additionally, in the configuration of the first to third embodiments above, a phase shift proportional to the voltage outputted from the bias power sources 4-i, 4-q, 4-i-X, 4-i-Y, 4-q-X, and 4-q-Y is produced, but the configuration of the present invention is not limited to such embodiments. For example, a configuration is possible in which, instead of the optical phase shift units 12-i, 12-q, 12-i-X, 12-q-X, 12-i-Y, and 12-q-Y, heaters are installed near the optical waveguides 202, 203, 206, 207, 202-X, 203-X, 206-X, 207-X, 202-Y, 203-Y, 206-Y, and 207-Y, heater power is supplied by the bias power sources 4-i, 4-q, 4-i-X, 4-i-Y, 4-q-X, and 4-q-Y, and the optical phase is shifted by thermal expansion. In this case, the optical phase is shifted in proportion to the power rather than the voltage.

Also, in the configuration of the first and second embodiments above, the bias adjustment device 2 is provided with the quadrature bias adjustment unit 21 and the data bias adjustment unit 22, but the configuration of the present invention is not limited to such embodiments. The bias adjustment device 2 may also be configured to include any or all of the modulated light monitoring units 90, 91, and 92, and moreover, the bias adjustment device 2 may also be configured to include any or all of the bias power sources 4-i, 4-q, and 5.

Also, in the configuration of the third embodiment above, the bias adjustment device 2b is provided with the quadrature bias adjustment units 21-X, 21-Y and the data bias adjustment unit 22b, but the configuration of the present invention is not limited to such an embodiment. The bias adjustment device 2b may also be configured to include any or all of the modulated light monitoring units 90-X, 90-Y, and 93, and moreover, the bias adjustment device 2b may also be configured to include any or all of the bias power sources 4-i-X, 4-q-X, 4-i-Y, 4-q-Y, 5-X, and 5-Y.

The data bias adjustment units 22, 22b and the quadrature bias voltage adjustment units 21, 21-X, 21-Y in the embodiments described above may also be achieved with a computer. In this case, a program for realizing the functions may be recorded to a computer-readable recording medium, and the units may be realized by causing a computer system to read and execute the program recorded on the recording medium. Note that the "computer system" referred to herein is assumed to include an OS and hardware such as peripheral devices. In addition, the "computer-readable recording medium" refers to a portable medium such as a flexible disk, a magneto-optical disc, ROM, or a CD-ROM, or a storage device such as a hard disk built into the computer system. Furthermore, the term "computer-readable recording medium" may also encompass media that briefly or dynamically retain the program, such as a communication line in the case of transmitting the program via a network such as the Internet or a communication channel such as a telephone line, as well as media that retain the program for a given period of time, such as volatile memory inside the computer system acting as the server or client in the above case. Moreover, the above program may be a program for achieving a portion of the functions described above, a program with which the functions described above can be achieved in combination with a program already recorded in the computer system, or a program achieved using a programmable logic device such as a field-programmable gate array (FPGA).

The foregoing describes embodiments of the present invention in detail and with reference to the drawings. However, specific configurations are not limited to these embodiments, and also include designs and the like within a scope that does not depart from the gist of the present invention.

INDUSTRIAL APPLICABILITY

The present invention may be used by being embedded into an optical transmission device that generates a many-valued QAM signal with significant incompleteness of the optical circuit due to manufacturing error, for example.

REFERENCE SIGNS LIST

S IQ optical modulation system
1a, 1b IQ optical modulator
2 bias voltage adjustment device
3-i, 3-q driving amplifier
4-i, 4-q bias power source
10-i, 10-q optical modulation unit
11-i, 11-q optical modulator
12-i, 12-q optical phase shift unit
13-i, 13-q driving signal electrode
14-i, 14-q data bias electrode
15 quadrature bias electrode
40 optical phase shifter
50 optical splitting unit
53 optical coupling unit
55 optical tap
90, 91, 92 modulated light monitoring unit
200 to 211 optical waveguide

The invention claimed is:

1. A bias voltage adjustment device that adjusts a plurality of bias voltages for maintaining a signal quality of an optical QAM signal outputted from an IQ optical modulator including an optical modulation unit for an I component that generates an optical electric field EI on a basis of a data signal for the I component, an optical modulation unit for a Q component that generates an optical electric field EQ on a basis of a data signal for the Q component, and an optical phase shifter that adjusts an optical phase difference between the optical electric field EI and the optical electric field EQ, the bias voltage adjustment device comprising:
 a first bias power source that generates a first data bias voltage to be applied to the optical modulation unit for the I component;
 a second bias power source that generates a second data bias voltage to be applied to the optical modulation unit for the Q component; and
 a third bias power source that generates a quadrature bias voltage to be applied to the optical shifter;
 a data bias voltage adjustment unit that determines whether or not the first and second data bias voltages are optimal on a basis of the first optical QAM signal generated by the IQ optical modulator, and applies a feedback control to each of the first bias power source and the second bias power source; and
 a quadrature bias voltage adjustment unit that determines whether or not the quadrature bias voltage is optimal on a basis of the second optical QAM signal generated by the IQ optical modulator, and applies a feedback control to the third bias power source, wherein
 the first optical QAM signal and the second optical QAM signal are generated by the IQ optical modulator but the optical phase difference between the optical electric field EI and the optical electric field EQ differs by $\pi$.

2. The bias voltage adjustment device according to claim 1, wherein
 the quadrature bias voltage adjustment unit applies a feedback control causing the optical phases of the optical electric field EI and the optical electric field EQ of the second optical QAM signal to approach orthogonality, and
 the data bias voltage adjustment unit applies a feedback control such that symbols in a constellation of the first optical QAM signal are arranged as symmetrically with respect to an origin.

3. The bias voltage adjustment device according to claim 1, wherein
 the quadrature bias voltage adjustment unit applies a feedback control causing the optical phases of the optical electric field EI and the optical electric field EQ of the second optical QAM signal to approach orthogonality, and
 the data bias voltage adjustment unit applies a feedback control such that the optical modulation unit for the I component and the optical modulation unit for the Q component are biased to a null point.

4. An IQ optical modulation system comprising:
 an optical splitting unit that splits input light into first input light and second input light;
 an optical modulation unit for an I component, driven on a basis of a data signal for the I component, that modulates the first input light to generate an optical electric field EI;
 an optical modulation unit for a Q component, driven on a basis of a data signal for the Q component, that modulates the second input light to generate an optical electric field EQ;
 an optical phase shifter that adjusts an optical phase difference between the optical electric field EI and the optical electric field EQ;
 an optical coupling unit that combines the optical electric field EI and the optical electric field EQ with the phase difference adjusted by the optical phase shifter to generate an optical QAM signal, and outputs the generated optical QAM signal from an output port;
 an output side optical waveguide that externally outputs the optical QAM signal;
 a first bias power source that generates a first data bias voltage that adjusts a light intensity of the optical electric field EI in an undriven state to a predetermined value;
 a second bias power source that generates a second data bias voltage that adjusts a light intensity of the optical electric field EQ in an undriven state to a predetermined value;
 a third bias power source that generates a quadrature bias voltage that adjusts the optical phase difference produced by the optical phase shifter;
 a data bias voltage adjustment unit that controls values of the first and second data bias voltages outputted from the first and second bias power sources;
 a quadrature bias voltage adjustment unit that controls a value of the quadrature bias voltage outputted from the third bias power source;

a first modulated light monitoring unit that monitors a first optical QAM signal obtained by using a splitting means to split the optical QAM signal propagating through the output side optical waveguide; and a second modulated light monitoring unit that monitors a second optical QAM signal, the second optical QAM signal being an optical signal leaked out from the optical coupling unit or an optical signal outputted from another output port provided in the optical coupling unit, wherein the data bias voltage adjustment unit applies a feedback control to the first and second bias power sources on a basis of a monitoring result of the first modulated light monitoring unit, and the quadrature bias voltage adjustment unit optimally maintains a signal quality of the first optical QAM signal by applying a feedback control to the third bias power source on a basis of a monitoring result of the second modulated light monitoring unit.

5. The IQ optical modulation system according to claim 4, wherein the data bias voltage adjustment unit sets the light intensity of both the optical electric field EI and the optical electric field EQ in the undriven state to 0, or applies a feedback control to the first bias power source and the second bias power source such that symbols in a constellation of the first optical QAM signal are arranged as symmetrically with respect to an origin.

6. The IQ optical modulation system according to claim 4, further comprising:

a polarization demultiplexer that separates input light into an X polarization and a Y polarization;

two IQ optical modulators that respectively acquire the input light of the X polarization and the Y polarization separated by the polarization demultiplexer, each of the IQ optical modulators at least including the optical splitting unit, the optical modulation unit for the I component, the optical modulation unit for the Q component, the optical phase shifter, and the optical coupling unit; and a polarization multiplexer that polarization-multiplexes the optical QAM signal of the X polarization and the optical QAM signal of the Y polarization respectively outputted by the two IQ optical modulators, wherein the optical splitting unit splits the polarization-multiplexed optical QAM signal propagating through the output side optical waveguide, the first modulated light monitoring unit monitors an optical QAM signal obtained from the splitting by the optical splitting unit, and the data bias adjustment unit applies a feedback control to each of the two first bias power sources and each of the two second bias power sources on a basis of a monitoring result of the first modulated light monitoring unit.

7. The IQ optical modulation system according to claim 4, wherein a split ratio of the optical splitting unit is set such that the light intensity outputted toward the first modulated light monitoring unit is decreased, and also such that A/B is 10 or greater when the split ratio expressed as a ratio of light intensities is A:B.

* * * * *